(12) United States Patent
Coulombe

(10) Patent No.: US 8,401,076 B2
(45) Date of Patent: Mar. 19, 2013

(54) VIDEO RATE CONTROL FOR VIDEO CODING STANDARDS

(75) Inventor: Stéphane Coulombe, Brossard (CA)

(73) Assignee: Vantrix Corporation, Montreal (CA)

( * ) Notice: Subject to any disclaimer, the term of this patent is extended or adjusted under 35 U.S.C. 154(b) by 737 days.

(21) Appl. No.: 12/518,955

(22) PCT Filed: Dec. 11, 2007

(86) PCT No.: PCT/CA2007/002242
§ 371 (c)(1),
(2), (4) Date: Nov. 20, 2009

(87) PCT Pub. No.: WO2008/070987
PCT Pub. Date: Jun. 19, 2008

(65) Prior Publication Data
US 2010/0080292 A1    Apr. 1, 2010

Related U.S. Application Data

(60) Provisional application No. 60/874,250, filed on Dec. 12, 2006.

(51) Int. Cl.
*H04N 7/12* (2006.01)
(52) U.S. Cl. ......... 375/240.12; 375/240.01; 375/240.13; 375/240.14; 375/240.15; 375/240.26
(58) Field of Classification Search ............. 375/240.01, 375/240.12–240.15, 240.26
See application file for complete search history.

(56) References Cited

U.S. PATENT DOCUMENTS

| 5,717,464 A | 2/1998 | Perkins |
| 6,141,380 A | 10/2000 | Krishnamurthy et al. |
| 6,233,226 B1 | 5/2001 | Gringeri et al. |
| 6,330,286 B1 | 12/2001 | Lyons et al. |
| 6,356,309 B1 | 3/2002 | Masaki et al. |
| 6,678,322 B1 | 1/2004 | Mihara |
| 6,731,685 B1 | 5/2004 | Liu |
| 7,023,924 B1 | 4/2006 | Keller et al. |
| 2004/0252758 A1 | 12/2004 | Katsavounidis |
| 2006/0140270 A1 | 6/2006 | Li et al. |
| 2006/0233236 A1 | 10/2006 | Labrozzi |

(Continued)

FOREIGN PATENT DOCUMENTS

| CA | 2264834 | 1/1999 |
| JP | 2005538606 | 12/2005 |

(Continued)

OTHER PUBLICATIONS

"Video Codec Test Model, Near-Term, Version 8 (TMN8) Revision 1" ITU=T Telecommunication Standardization Sector of ITU, Geneva, CH, vol. Q.15/16, pp. I-III, 01 XP001074663, Sep. 8, 1997.

(Continued)

*Primary Examiner* — Sath V Perungavoor
*Assistant Examiner* — Geepy Pe
(74) *Attorney, Agent, or Firm* — IP-MEX Inc.; Victoria Donnelly

(57) ABSTRACT

A method and device for improving rate controlling in video coding of sequences including a series of Inter frames separated by Intra frames, when a decoding delay is considered, comprise for each Inter frame of the series: computing a target frame size, computing a maximum buffer level related to a position of each Inter frame relative to a previous Intra frame and an upcoming Intra frame, and optimizing a transmission buffer level in response to the computed target frame size and the computed maximum buffer level.

45 Claims, 8 Drawing Sheets

U.S. PATENT DOCUMENTS

2007/0009025 A1     1/2007    Kwon et al.
2007/0153916 A1     7/2007    Demircin et al.

FOREIGN PATENT DOCUMENTS

WO     WO2008/070987     6/2008

OTHER PUBLICATIONS

Li Z G et al. "A Novel Rate Control Scheme for Video Over Internet" 2002 IEEE International Conference on Acoustics, Speech, and Signal Processing. Proceedings (ICASSP). Orlando, Fl, May 13-17, 2002; (IEEE International Conference on Acoustics, Speech, and Signal Processing(ICASSP) ), New York, NY: IEEE, US, vol. 2, pp. II-2065, XP010804307, ISBN: 978-0-7803-7402-7 May 13, 2002.

Chih-Feng Chang et al. "A Stable Buffer Control Strategy for MPEG Coding", IEEE Transactions on Circuits and Systems for Video Technology, IEEE Service Center, Piscataway, NJ, US vol. 7, No. 8 XP011014428, ISSN:1051-8215 Dec. 1, 1997.

Song, H. et al. "Rate Control for Low-Bit-Rate Video via Variable-Encoding Frame Rates" IEEE Transactions on Circuits and Systems for Video Technology, vol. 11, No. 4, Apr. 2001.

Lee, Hung-Ju et al. "Scalable Rate Control for MPEG-4 Video" IEEE Transactions on Circuits and Systems for Video Technology, vol. 10 No. 6, Sep. 2000.

Jordi Ribas-Corbera, Rate Control in DCT Video Coding for Low-Delay Communications, IEEE Transactions on Circuits and Systems for Video Technology, vol. 9, No. 1, Feb. 1999.

Gallant, Michael, Cote, Guy, Kossentini Faouzi, An Efficient Computation-Constrained Block-Based Motion Estimation Algorithm for Low Bit Rate Video Coding, IEEE Transactions on Image Processing, vol. 8, No. 12, Dec. 1999.

Baldi, Mario and Ofec, Joram, End-to-End Delay Analysis of Videoconferencing over Packet-Switched Networks, IEEE Transactions on Networking, vol. 8,No. 4, Aug. 2000.

F.Pan, Z.G.Li, K.P.Lim, X.Lin, S.Rahardga, D.J.Wu and S.Wu, Adaptive Intra-Frame Quantization for Very Low Bit Rate Video Coding, Institute for Infocomm Research, Singapore, IEEE, 2004.

Bo Xie and Wenjun Zeng, A sequence-Based Rate Control Framework for Consistent Quality Real-Time Video, IEEE Transactions on Circuits and Systems for Video Technology, vol. 16, 2006.

Minqiang Jiang and Xiaoquan, Yi, Improved Frame-Layer Rate Control for H.264 Using MAD Ratio, ISCAS 04 Proceedings of the 2004 International Symposium on Circuits and System 2004.

Jyi-Chang Tsai and Chaur-Heh Hgieh, Modified TMN8 Rate Control for Low-Delay Video Communications, IEEE Transactions on Circuits and Systems for Video Technology, vol. 14, No. 6, Jun. 2004.

Hoda, Roodaki, Mahmoud Reza Hashemi, Omid Fatemi, A Frame Layer Bit Allocation for H.264 Based on Frame Complexity, Multimedia Processing Laboratory, Faculty of Electrical and computer Engineering, University of Teheran, Teheran, Iran, IEEE CCECE/CCGEI, Ottawa, May 2006.

Minqiang Jiang and Nam Ling,Low-Delay Rate Control for Real-Time H.264/AVC Video Coding, IEEE Transactions on Multimedia, vol. 8, No. 3, Jun. 2006.

Sullivan, Gary, Draft Text of Recommendation H.263 Version 2 ("H.263+") for Decision, Sep. 25, 1997, ITU.

ITU-T Recommendation H.264, Series H: Audiovisual and Multimedia Systems Infrastructure of audiovisual services—Coding of moving video, Advanced video coding for generic audiovisual services, Mar. 2005.

Alberink, Martin and IACOB, Sorin GigaCE/D1.11 project, Telematica Instituut, Enschede, The Netherlands, Jul. 21, 2001.

Zhengguo Li, Feng Pan, Genan Feng, Kengpang Lim, Xiao Lim, Susanto Rahardja "New Rate Control Algorithm" Joint Video Team (JVT) of ISO/IEC MPEG & ITU-T VCEG No. JVT-E024, Oct. 18, 2002.

FIG_2

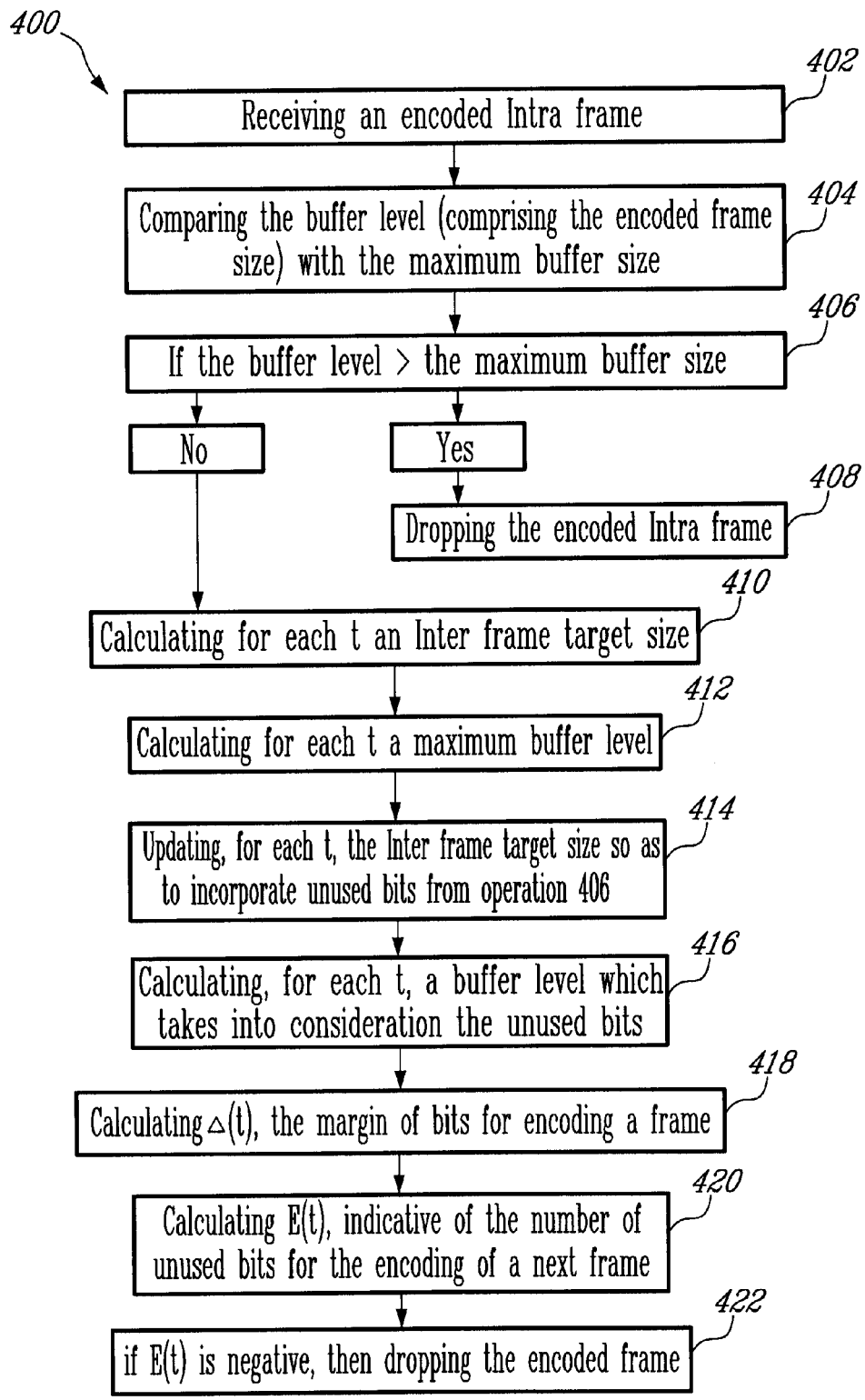

VIDEO RATE CONTROL FOR VIDEO CODING STANDARDS

FIELD OF THE INVENTION

The present invention generally relates to video coding. More specifically, the present invention is concerned with video rate controlling in video coding, for example but not exclusively for video coding standards such as the H.263 and MPEG-4 (Moving Picture Experts Group-4) standards.

BACKGROUND OF THE INVENTION

The past few years have witnessed a great popularity of digital and online videos and their applications. With the emergence of fast communication technologies and multimedia applications, digital video codecs are used in many areas and systems, such as in DVDs (Digital Video Disc) employing the MPEG-2 (Moving Picture Experts Group-2) format, in VCDs 2 (Video Compact Disc) employing the MPEG-1 (Moving Picture Experts Group-1) format, in emerging satellite and terrestrial broadcast systems, and on the Internet.

More specifically, this popularity of video applications allowed for interesting developments in video codecs, which compress and decompress video data. In video data compression, a balance is kept between the video quality and the compression rate, i.e. the necessary transmitted quantity of data, in other words, the bitrate needed to represent a video.

In addition, the complexity of encoding and decoding algorithms, robustness to data losses and errors, the state of the art of compression algorithm design, end-to-end delay in a videoconference application for example, etc., are also considered.

A plurality of video coding standards exist, each of them is specially designed for a particular type of application. For example, the H.263 standard, published by the ITU (International Telecommunications Union) is a video coding and compression standard for low bitrates, such as in the range of 40-128 kbps (kilobits per second). More specifically, this standard supports video coding in video-conferencing and video-telephony applications.

The H.263 standard specifies the format and content of the encoded stream of data, therefore, it sets the requirements for the encoder and decoder to meet, without specifically providing a design or structure of an encoder and decoder themselves. Similar principles apply to other video standards such as MPEG-4.

In video compression, each picture is represented by typically two kinds of pictures, commonly referred to as frames, i.e. the Intra frames and Inter frames. Furthermore, the Inter frames are separated into two categories, i.e. the P-frames (Predictive frames) and B-frames (Bi-predictive or Bi-directional frames). The Intra frames represent a whole picture, therefore they are bandwidth consuming since the content of the whole picture must be encoded. In order to compress and therefore save bandwidth, only differences between whole pictures (or Intra frames) are encoded and then transmitted. Those differences are represented by the P-frames and the B-frames. For example, the background between two consecutive pictures usually do not change, therefore, the background does not need to be encoded again. The B-frames are bi-directional and thus perform a bi-directional prediction, i.e. a prediction with the previous and next pictures.

Furthermore, when compressing videos, a picture is divided into macroblocks for processing purposes. Indeed, processing is applied macroblock by macroblock. Each macroblock generally represents a block of 16 by 16 pixels.

A video encoder generally includes a motion estimation module, a motion compensation module, a DCT (Discrete Cosine Transforms) module, and a quantizing module.

The motion estimation module allows for predicting which areas of a previous frame have been moved into the current frame so that those areas do not need to be re-encoded.

The motion compensation module allows for compensating for the movement of the areas from the previous frame into the current frame.

DCT are generally used for transforming a block of pixels into "spatial frequency coefficients". They operate on a two-dimensional block of pixels, such as a macroblock. Since DCT are efficient at compacting the energy (or information) of pictures, generally a few DCT coefficients are sufficient for recreating the original picture.

Also, a quantizing module is provided for quantizing the DCT coefficients. For example, the quantizing module sets the near zero DCT coefficients to zero and quantizes the remaining non-zero DCT coefficients.

One of the limitations in video coding comes from the capacity of a channel. Indeed, communication channels are limited by the number of bits that they can transmit per second. In many channels, the bitrate is constant, such as in ISDN (Integrated Services Digital Networks), POTS (Plain Old Telephone Service), wireless channels, etc.

However, depending on the efficiency of the algorithms used to compress the videos and the motion complexity of those videos, the bit budget and the bitrate needed for encoding and transmitting the encoded videos may vary or increase. Therefore a rate control is used to adjust the bitrate required for encoding videos of various complexity to the bitrate of the channel used to transmit those encoded videos.

The current rate control algorithm used in the H.263 standard is called the TMN8 (Test Model Near-Term version 8). Generally stated, this rate control algorithm ensures that only an average bitrate is met.

The paper entitled "*Rate Control in DCT Video Coding for Low-Delay Communications*", by Jordi Ribas-Corbera, 1999, hereinafter referred to as Reference 1, discloses an algorithm used by the rate control TMN8 to ensure that the target average bitrate, related to a target frame size, is met by each frame. More specifically, the TMN8 rate control algorithm computes some image statistics to determine some proper QP (Quantization Parameter) values for each macroblock and update them within each Inter frame so as to meet the target frame size. Unfortunately, this control is very approximate and often the resulting frame size can be significantly over or under the target frame size. For Intra frames, a fixed QP is used for the whole video sequence regardless of the characteristics of the video sequence. Having no control over the size of Intra frames is generally a factor leading to exceeding the desired bitrate.

Furthermore, the rate control TMN8 cannot control both an average target bitrate and a maximum bitrate. Indeed, the TMN8 rate control algorithm used in the H.263 video coding standard only uses an average bitrate parameter. However, in many video applications, a maximum bitrate should also be considered in addition to the average bitrate.

TMN8 cannot guarantee to not exceed a given target bitrate, since the encoder has no control over the Intra frame sizes and no sufficient control over the Inter frame sizes. When the given target bitrate is exceeded, the encoder will skip a certain number of frames so as to compensate for the overflow. However, by so doing, the quality of the communication and the videos is altered.

Therefore, there is a need for overcoming the above discussed problems, related to the limitations of the current rate control in video coding standards, such as the H.263 standard. Accordingly, a method and system for improving the rate control in video coding standard are sought.

OBJECTS OF THE INVENTION

An object of the present invention is therefore to provide rate control in video coding, for example in video coding standards such as the H.263 and MPEG-4 standards, so as to enhance the quality of the videos by ensuring that an average bitrate and a maximum bit rate are both respected.

SUMMARY OF THE INVENTION

More specifically, in accordance with the present invention, there is provided a method for rate controlling in video coding, which comprises: specifying a maximum bitrate and an average bitrate, calculating an Inter frame size for meeting with the specified maximum bitrate, the Inter frame size being related to a position of the Inter frame relative to a position of an Intra frame, and adjusting the calculated Inter frame size for meeting with both the specified maximum bitrate and the average bitrate.

Furthermore, the present invention also relates to a method for improving rate controlling in video coding of sequences including a series of Inter frames separated by Intra frames, when a decoding delay is considered. The method comprises, for each Inter frame of the series: computing a target frame size, computing a maximum buffer level related to a position of each Inter frame relative to a previous Intra frame and an upcoming Intra frame, and optimizing a transmission buffer level in response to the computed target frame size and the computed maximum buffer level.

The present invention further relates to a device for rate controlling in video coding, which comprises: a first calculator of an Inter frame size for meeting with a specified maximum bitrate, the Inter frame size being related to a position of the Inter frame relative to a position of an Intra frame, and a second calculator of the Inter frame size calculated by the first calculator for meeting with a specified average bitrate, in addition to the specified maximum bitrate.

The present invention is further still concerned with a device for improving rate control in video coding of sequences including a series of Inter frames separated by Intra frames, when a decoding delay is allowed. The device comprises, for each Inter frame: a calculator of a target frame size, a calculator of a maximum buffer level related to a position of each Inter frame relative to a previous Intra frame and an upcoming Intra frame, and an optimizer of a transmission buffer level in response to the computed target frame size and the computed maximum buffer level.

The foregoing and other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 9 a flow chart illustrating a method according to another non-restrictive illustrative embodiment of the present invention for rate control in the H.263 video coding standard.

DETAILED DESCRIPTION

Figure 1:
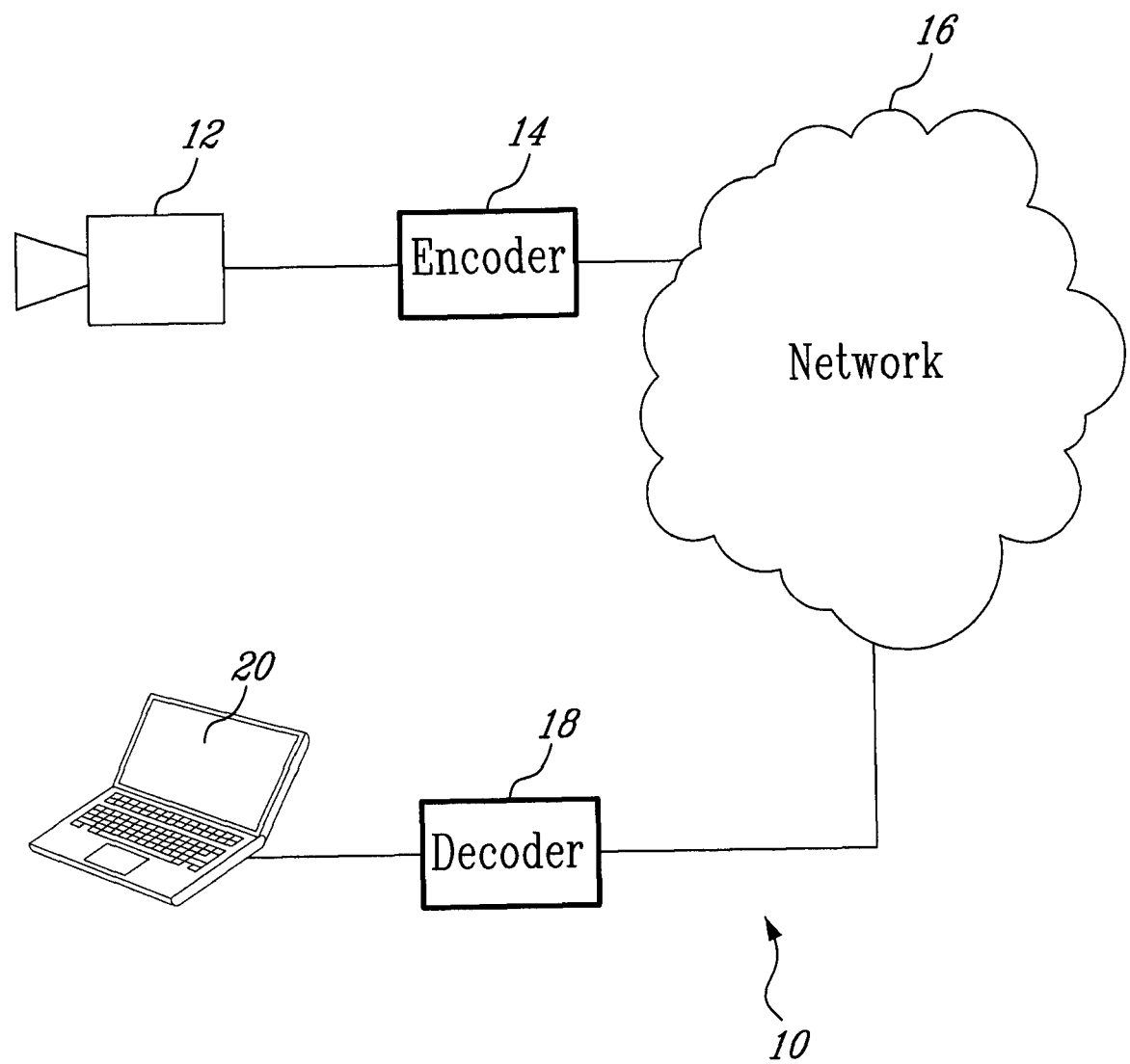
FIG. 1 is a schematic diagram of a video communication system.

Generally stated, a device for improving the rate control according to the non-restrictive illustrative embodiment of the present invention allows for addressing the following requirements, which are not met with by the TMN8 rate control:

1. Being able to specify and meet with a target frame size for an Intra frame:
   by so doing, the quality of the Intra frame and fluctuations in the bitrate caused by the presence of the Intra frame can be controlled; and
   the QP (Quantization Parameters) are not fixed but computed based on the Intra frame characteristics and may change for each block of pixels of the Intra frame in order to meet the specified Intra frame target size.

2. Being able to specify and meet with a maximum bitrate in addition to an average bitrate:
   furthermore, a validation on the encoded frame size is performed, after the frame has been encoded; if the encoded frame size is too large to be acceptable, compared to the maximum bitrate, then the frame needs to be either re-encoded with a smaller target size or dropped;
   in the contrast, the TMN8 rate control attempts to meet with only an average bitrate, by dropping frames for example; it cannot meet with a maximum bitrate.

3. Having a circular buffer to manage the maximum bitrate and another buffer for the average bitrate;
   in the contrast, the TMN8 uses only one transmission buffer.

4. Estimating and calculating an Inter frame target size, which depends on the timing and encoding of an Intra frame: if an Infra frame has been recently encoded or if an Intra frame will soon be encoded;
   also, the estimates of the Inter frame target size takes into consideration various parameters, such as the size of the Intra frame, the period between two Intra frames, the number of bits under or over the average bitrate, etc.
   in the contrast, the TMN8 uses a target size which is based on the transmission buffer occupancy and rate only; it never predicts upcoming Intra frames and typically skip many frames after the encoding of an Intra frame, therefore causing a degradation in the video quality.

5. Dropping frames in a proactive and preventive way:
   the device according to one non-restrictive illustrative embodiment of the present invention ensures that the maximum bitrate is never exceeded, and drops frames if required, before transmitting them; the decision to drop frames is based on a difference between what was estimated and what was achieved, i.e. what was actually encoded;

in the contrast, the TMN8 skips frames after having created and transmitted a frame that was too large and leading to exceeding the target size; by so doing, harm has been already done to the quality of the videos; furthermore, the decision to drop frames is based on the level of fullness of the transmission buffer.

I. The System

First, a video communication system will be described so as to define a communication system in which video coding takes place. However, the communication system is not part of the present invention.

Turning to FIG. 1, a communication system 10 will be described.

The communication system 10 comprises a video source 12, such as a video camera or web camera, for capturing videos. Those videos are then provided to a video encoder 14. The video encoder 14 is connected to a network 16. The network 16 can also include a communication link for transmitting the encoded videos to a decoder 18. Finally, the decoder 18 is connected to a video player 20. The video player 20 can be a computer, a television set, or any device which can display videos.

During a communication session between, for example, first and second parties, the videos captured by the video source 12 of the first party are received by the encoder 14, which then can perform video compressing and coding. Once the encoder 14 has finished encoding the video data, the encoded video is transmitted to the second party through the network 16 or simply a communication link. At the second party's end, the decoder 18 receives the encoded video and starts decoding it. Once the encoded video is decoded, the decoder 18 sends the decoded video data to the video player 20, which then can start playing the video received from the first party.

Figure 2:
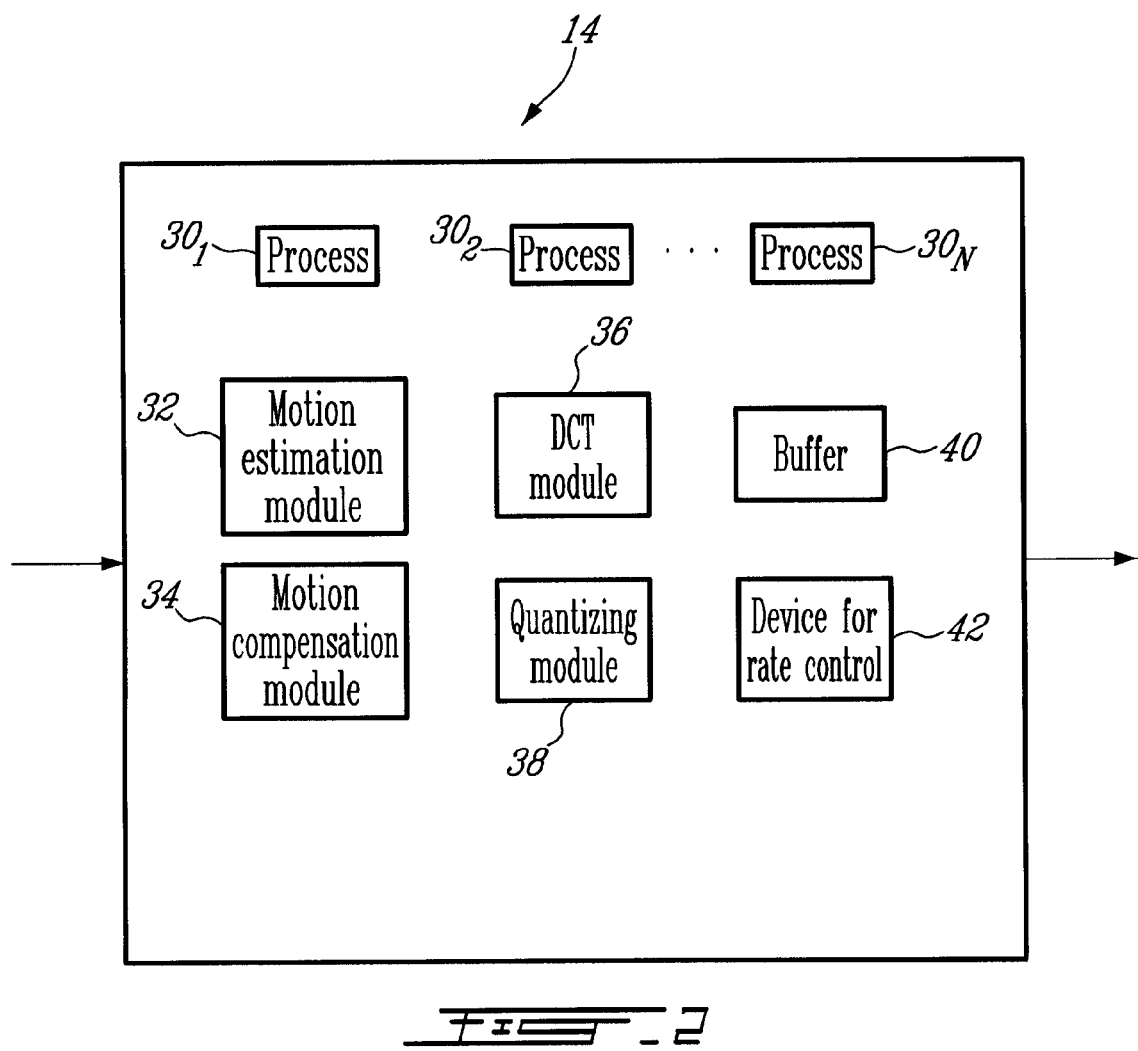
FIG. 2 is a schematic block diagram of an encoder for video coding in the communication system of FIG. 1.

The encoder 14 is detailed in FIG. 2. The encoder 14 includes one or a plurality of processes 30₁ to 30ₙ, which allows for performing different operations in video coding as will be described hereinafter. The encoder 14 further includes a motion estimation module 32, a motion compensation module 34, a DCT module 36, a quantizing module 38, and a buffer 40.

It should be noted that this encoder 14 can be implemented in different platforms, such as, for example, the spot Xde® from Vantrix Corporation. The video source can be a video file or a video camera.

As mentioned hereinabove, the motion estimation module 32 allows for predicting an area of the previous frame that might have been moved into the current frame.

Then, the motion compensation module 34 aims at compensating for the movement detected by the motion estimation module 32.

The DCT module 36 performs the DCT transformation on blocks of pixels into spatial frequency coefficients.

Those spatial frequency coefficients are then supplied to the quantizing module 38 for quantizing them.

Encoded frames can be stored in a buffer 40 of the encoder 14. Therefore, the buffer 40 allows for receiving encoded frames, which are then transmitted through the communication link (network 16).

Finally, the encoder 14 also includes a rate controlling device 42 according to the present application, for controlling the bitrate in video coding. This rate controlling device ensures that the maximum capacity of the communication link is not exceeded and provides enhanced visual quality, especially for tele-surveillance applications and other applications exhibiting continuous video sequences.

II. The Device

The rate controlling device 42 implements an improved rate control in the encoder 14. More specifically, the device 42 implements a method 100 for controlling the bitrate in the H.263 and MPEG 4 video coding standard so as to meet with an average and maximum bitrate constraint. The method 100 will be described hereinbelow.

Figure 3:
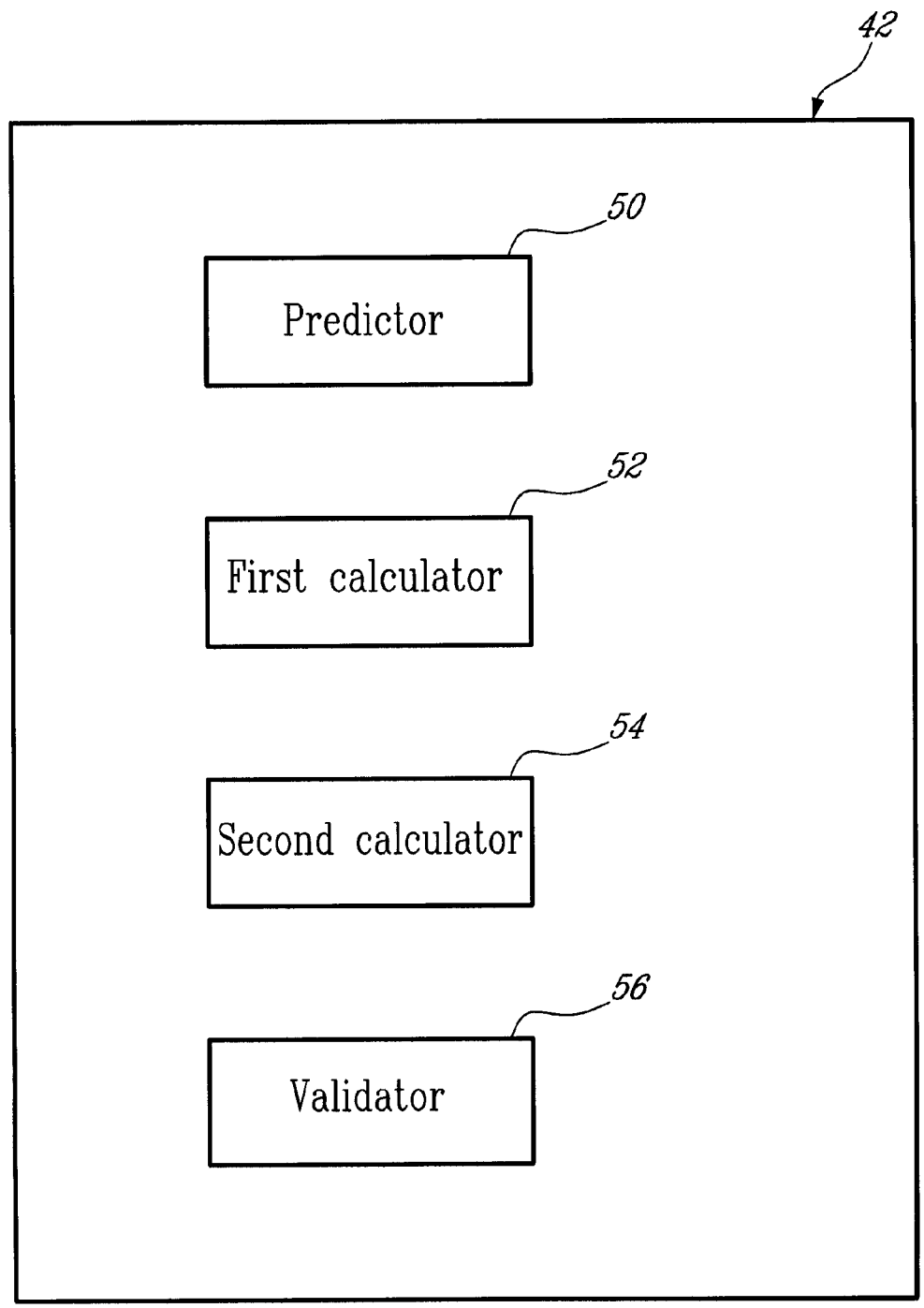
FIG. 3 is a schematic block diagram of a device for rate controlling in video coding in accordance with a non-restrictive illustrative embodiment of the present invention.

The device 42, as illustrated in FIG. 3, includes a predictor 50 for specifying a target size for Intra frames and predicting the required QP used in the quantizing module 38, for meeting the specified Intra frame target size. Since the size of the Infra frames can affect both quality and bursts in the bitrate, when controlling the bitrate, a target size is determined to set properly a bit budget for encoding the Intra frames.

The device 42 also includes a first calculator 52 of Inter frame sizes. The first calculator 52 allows for computing a target size of the Inter frames in different situations, for meeting with a maximum bitrate constraint, as will be described hereinbelow.

Furthermore, the device 42 includes a second calculator 54 for recalculating the Inter frame target sizes provided by the first calculator 52, so as to meet both the maximum bitrate and an average bitrate constraint.

Also, the device 42 includes a validator 56 for ensuring that the size of the encoded frame does not exceed the calculated Inter frame target size and the maximum size allowed by the maximum bitrate.

Finally, in order to meet with the constraint of the maximum and average bitrates, the process 30₂ in FIG. 2 has a circular buffer (not shown) for containing the size of the frames transmitted within the last one (1) second. For instance, at 10 frames/second, such a buffer would keep the size of the last 10 encoded frames.

Generally stated, the method 100 according to a non-restrictive illustrative embodiment of the present invention, for meeting with the maximum and average bitrates constraint uses two control processes, such as 30₂ and 30₃. For example, the process 30₂ may be used, along with the first and second calculators 52 and 54, for computing the target frame sizes required to avoid exceeding the maximum bitrate. And the process 30₃, along with the validator 56, is used to check, after encoding a frame, if the encoded frame can be transmitted, i.e. the maximum bitrate is not reached. In case the maximum bitrate has been exceeded, the encoded frame is dropped or the encoder 14 attempts to encode again the same frame but with different encoding parameters.

III. The Method

In the following, the method 100 according to the non-restrictive illustrative embodiment of the present invention for controlling the bitrate in video coding standards, such as the H.263 standard, will be described in connection with FIG. 4.

However, it should be noted that this rate control can be also used in other video coding standards, such as H.261, MPEG-4, H.264, etc.

As mentioned hereinabove, since the size of the Intra frames can affect both the quality and bursts in the bitrates, it is important to set a first bit budget for encoding the Intra frames, when controlling the bitrates.

In operation 101, a maximum bitrate $R_{MAX}$ and an average bitrate $R_{avg}$, are specified.

Then, in operation 102, a target size $B_I$ (in bits) of the Intra frame is specified.

In operation 103 of method 100, prediction of QP is performed, which allows for better meeting with the Intra frame target size specified in operation 102 when encoding an Intra frame. Operations 102 and 103 can be performed in the predictor 50 of FIG. 3, for example.

Then, in operation 104, a target size for an Inter frame is calculated in order to meet the specified maximum bitrate $R_{MAX}$, based on the target size of the Intra frame specified in operation 102. This operation 104 can be performed by the first calculator 52 in FIG. 3, for example.

In operation 106, the calculated Inter frame target size is recomputed so as to meet both the specified maximum bitrate and average bitrate. This operation can be performed by the second calculator 54 in FIG. 3, for example.

Finally, in operation 108, encoded frame sizes are validated against the computed frame sizes allowed by the maximum and average bitrates.

Now, more specifically, each operation of the method 100 of FIG. 4 will be described with greater details.

Operation 101: Specification of a Maximum Bitrate and an Average Bitrate

In order to obtain an improved quality of videos in video coding, a maximum bitrate, denoted as $R_{MAX}$, whose value should not be exceeded is set. The maximum bitrate is defined as the maximum number of bits that can be transmitted through a channel within any period of one (1) second. With this definition, the maximum size is equivalent to the maximum birate. It should be noted that other definitions of the maximum rate can also apply. It is within the scope and knowledge of those of ordinary skill in the art to specify and define a maximum bitrate according to each application. It is also known in the art how to specify an average bitrate over a period of frames.

Operation 102: Specification of an Intra Frame Target Size

It is within the knowledge and reach of those of ordinary skill in the art to know how to specify an Intra frame target size based on a particular application of video coding, and on the specified maximum and average bitrates. For instance, the Intra frame target size could be set as a percentage of the maximum bitrate $R_{MAX}$ or the average bitrate $R_{avg}$.

Operation 103: Prediction of QP in Order to Meet the Specified Intra Frame Target Size To do so, based on the estimation algorithm disclosed in "*Adaptive intra-frame quantization for very low bit rate video coding*" by Pan et al. 2004, hereinafter referred to as Reference 2, an estimation algorithm for predicting a QP (Quantization Parameter), used in the quantizing module 38, has been developed.

This algorithm is used by the predictor 50 in FIG. 3 for estimating the QP required in the quantizing module 38, in order to meet with the given Intra frame target size, based on the statistics of the Intra frame. However, unlike the teaching of Reference 2, where a constant QP is considered for the whole duration of the Intra frame, in the estimation algorithm that has been developed, the QP value may be updated for each GOB (Group of Blocks) of the Intra frame so as to meet more accurately with the specified target frame size. Also, while Reference 2 considers gray scale images, the developed estimation algorithm supports color images.

According to Reference 2, the relationship between the QP and other frame statistics can be described by:

$$QP = \frac{16.34}{B_I^{2.05}} MAV^{1.0+0.29ln(B_I)} \quad (1)$$

with $$MAV_{DCT} = \frac{1}{MN}\sum_{u=0}^{N-1}\sum_{v=0}^{M-1} ABS(F(u,v)),$$

F(u,v) containing the 8×8 DCT coefficients of all blocks of pixels of the picture of size N×M and $B_I$ is the specified Infra frame target size (in bits).

The term $MAV_{DCT}$ represents the mean absolute value of the DCT coefficients, and indicates a picture complexity measure. The term ABS( ) is the absolute value function.

It should be noted that equation (1) only considers the statistics of the luminance of a picture and ignores its chrominance. Therefore, a new equation is needed in order to take also into account the chrominance, which is generally subsampled by a factor of four (4) compared to the luminance, and is given by:

$$MAV_{DCT} = \frac{0.9}{MN}\sum_{u=0}^{N-1}\sum_{v=0}^{M-1} ABS(F(u,v)) + \frac{0.1}{4MN}\left(\sum_{u=0}^{N/2-1}\sum_{v=0}^{M/2-1} (ABS(F_{C1}(u,v)) + ABS(F_{C2}(u,v)))\right) \quad (2)$$

where $F_L(u,v)$ contains the 8×8 DCT coefficients of the blocks for the luminance and $F_{C1}(u,v)$ and $F_{C2}(u,v)$ contain the 8×8 DCT coefficients of the blocks for the chrominance.

As mentioned hereinabove, in order to meet more accurately with the specified Infra frame target size $B_I$, the QP is adjusted for each GOB of the Intra frame. Furthermore, equation (2) is modified so as to take into account the bits needed for encoding the remaining blocks of the Intra frame. The modified equation for predicting the QP is then as follows:

$$QP_{mod} = \frac{16.34}{B_I^{'2.05}} MAV_{DCT}^{1.0+0.29ln(B_I)} \quad (3)$$

with $$B_I' = \frac{(B_{remain})N_{total}}{(N_{remain} + N_{bias})},$$

where $B_{remain}$ is the number of bits that remain from the specified Intra frame target size for encoding the frame, $N_{total}$ is the total number of macroblocks in a frame, $N_{remain}$ is the number of the remaining macroblocks to encode in the frame, and $N_{bias}$ is a bias for making the QP estimation more conservative as the end of the frame to encode is approaching; typically $N_{bias}$=4.

After the QP have been computed so as to meet with the specified Intra frame target size $B_I$, method 100 moves on to operation 104.

Operation 104: Calculation of an Inter Frame Size in Order to Meet the Maximum Bitrate Constraint As a non-restrictive example, the Infra frame target size specified in operation 101 is considered constant; however the Inter frame target size depends on the situation. Two cases need to be considered:

i) Case 1: when an Intra frame has been encoded within the last second or will be encoded within the upcoming second; and ii) Case 2: only Inter frames have been encoded within the last second or will be encoded in the upcoming second, without any influences from the Intra frames.

Therefore, operation 104 needs to consider the two (2) above-mentioned cases, namely case 1 and case 2, for computing the Inter frame target size. Method 200 is used in case 1 and method 250 is used in case 2 by operation 104.

Method 200 for Calculating the Inter Frame Target Size in the Case where an Intra Frame is Encoded within the Last Second or is Going to be Encoded in the Upcoming Second (Case 1)

Figure 5:
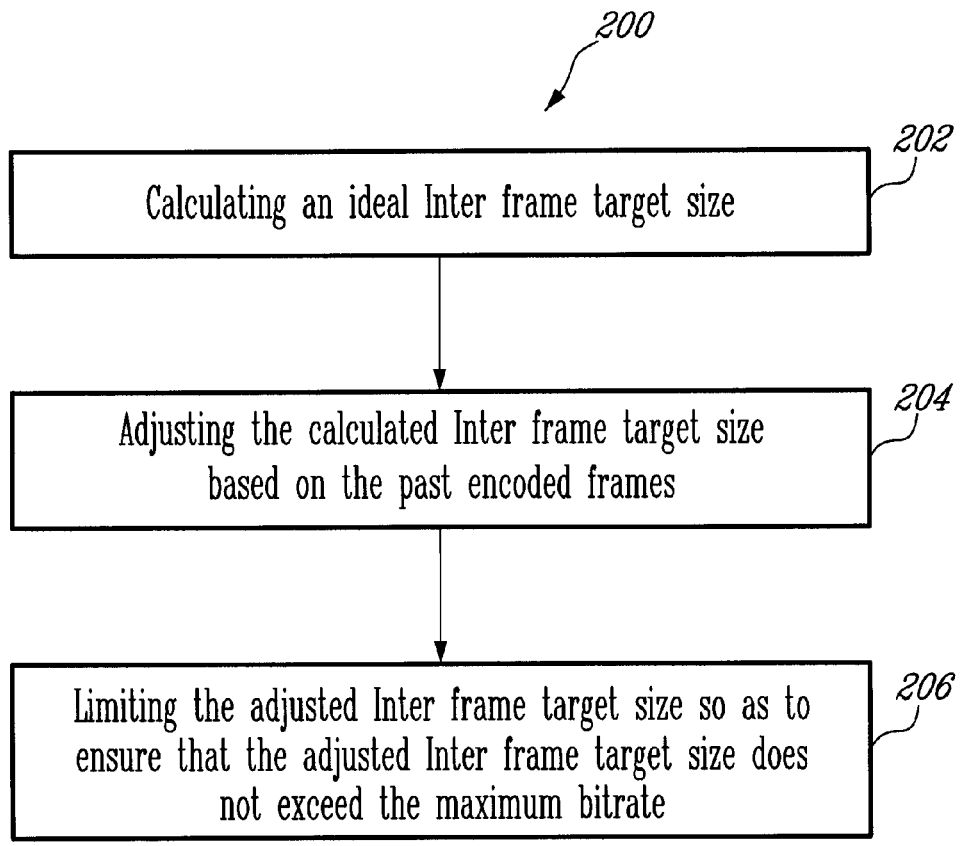
FIG. 5 is a flow chart illustrating an example of method for calculating an Inter frame target size.

Referring to FIG. 5, method 200 for calculating the Inter frame target size, in case 1, will be described.

First, in operation 202, an ideal Inter frame target size $B_2$ is computed, based on $R_{MAX}$. To do so, as a non-limitative example, all the Inter frames are assumed to have the same size, then, the maximum bitrate is given by:

$$R_{MAX} = B_I + (F-1)B_2 \qquad (4)$$

with $B_I$ being the Intra frame target size and $B_2$ being the ideal Inter frame target size in case 1, i.e. with an Intra frame encoded within the last second or to be encoded in the upcoming second and F being the number of frames per second to encode, i.e. the frame rate.

Then, from equation (4) the ideal Inter frame target size $B_2$ is given by:

$$B_2 = \frac{R_{MAX} - B_I}{(F-1)} \qquad (5)$$

By definition, as shown in equation (5), F is greater than 1 frame/s.

At first, the Inter frame target size for case 1, denoted as $B_{PI}$, is given by the ideal Inter frame target size $B_2$ calculated in operation 202:

$$B_{PI} = B_2$$

However, the above Inter frame target size $B_{PI}$ is adjusted to take into account the influences of the past encoded frames, especially the Intra frames. Indeed, in general, the encoded frames do not have a size which is exactly equal to the target size. Accordingly, the future Inter frame sizes are adjusted so that the differences between the actual size of the encoded frames and the target sizes are accounted for so as to ensure that there will be enough bits allocated in the encoding of a future Intra frame, without exceeding the maximum bitrate $R_{MAX}$.

Therefore, in operation 204, an adjusted Inter frame target size based on the past encoded frames is computed, through the first calculator 52 of FIG. 3, for example. To do this, two (2) cases are considered:

i) If an Intra frame has been encoded within the last second, the size of the next Inter frame $B_P$ will be adjusted and limited by using the following equation:

$$B_{PI} = \max(0, \min(B_{PI}, tmp)) \qquad (6)$$
with $$tmp(t) = \frac{R_{MAX} - \sum_{k=t-(T-N)}^{t-1} SizeHistory[k]}{F - (T-N)} \qquad (7)$$

where SizeHistory[k] is the size of the encoded frame k, t is the index of the current frame to encode, T is the period (in number of frames) between two Intra frames, N is the number of frames remaining before the next Intra frame. tmp(t) represents the bit budget buffer at frame t. Also, in equation (6), the zero (0) inside the maximum function allows for avoiding an underflow of the buffer.

It should be noted that equations (6) and (7) allow for dividing substantially equally any additional bits from the bit budget for encoding frames between the remaining Inter frames to be encoded within the second following the Intra frame. Also, it should be noted that the frame at time t-(T-N) is the one which was Intra-coded.

ii) If an Intra frame is to be encoded in the upcoming second then the target size of the next Inter frame will be limited as follows:

$$B_{PI} = \max(0, \min(B_{PI}, tmp)) \qquad (8)$$
with $$tmp(t) = \frac{R_{MAX} - B_I - \sum_{k=t-(F-N)+1}^{t-1} SizeHistory[k]}{N} \qquad (9)$$

where SizeHistory[k] is the size of the encoded frame k, t is the index of the current frame to be encoded, and N is the number of frames remaining before the next Intra frame.

It should be noted that in equation (9), F-(N-1) terms have been added. Therefore, the size of the (N-1) remaining frames is calculated in the period with one frame being an Intra frame. Accordingly, the equation representing the bit budget buffer tmp(t) contains a division by N.

Finally, in operation 206, the adjusted Inter frame target size is recalculated so as to ensure that it does not exceed the maximum size allowed by the maximum bitrate $R_{MAX}$, while keeping a small margin of error and considering the bits that have been used to encode the past frames.

Accordingly, the Inter frame target size is limited by using the following equation:

$$B_{PI} = \max(0, \min(B_{PI}, tmp2)) \qquad (10)$$
with $$tmp2(t) = R_{MAX} - R_{margin} - B_I - \sum_{k=t-F+1}^{t-1} SizeHistory[k] \qquad (11)$$

where $R_{margin}$ is the margin of error for ensuring that the Inter frame target size does not exceed the maximum size allowed by the maximum bitrate $R_{MAX}$.

In case there is no Intra frame encoded within the last second or to be encoded in the upcoming second, which corresponds to case 2, operation 104 uses method 250 for calculating an Inter frame target size.

Method 250 for Calculating the Inter Frame Target Size in the Case where No Intra Frame is Encoded within the Last Second or to be Encoded in the Coming Second (Case 2)

Figure 6:
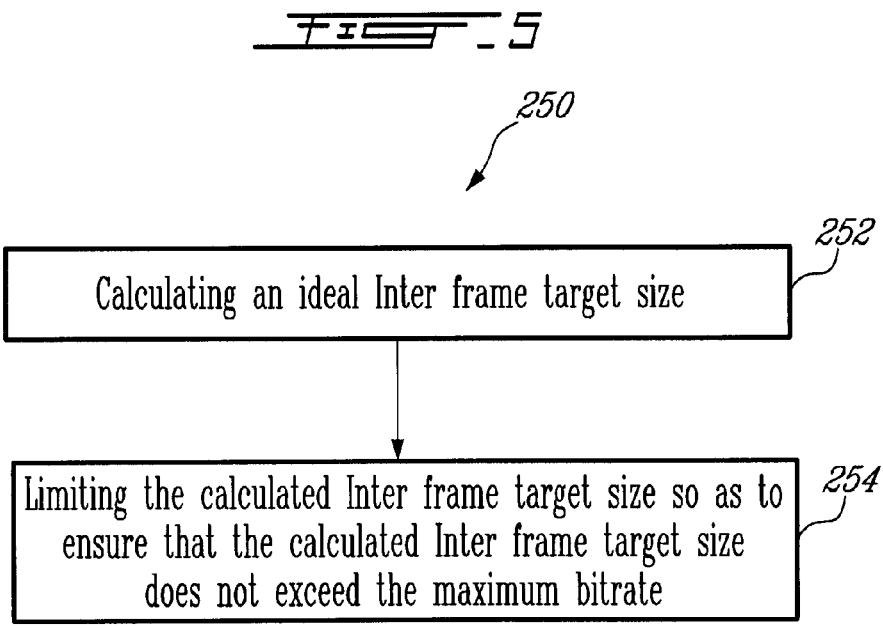
FIG. 6 is a flow chart illustrating another example of method for calculating an Inter frame target size.

Turning now to FIG. 6, method 250 for calculating an Inter frame target size, in case 2, will be described.

First, in operation 252, an ideal target size $B_3$ of the Inter frames is calculated, based on the maximum bitrate. In this case, since it is assumed that the Intra frames are absent, the maximum bitrate $R_{MAX}$ during any second is given by:

$$R_{MAX} = F \cdot B_3 \quad (12)$$

where $B_3$ is the ideal Inter frame target size without any Intra frame encoded within the last second or to be encoded in the upcoming second.

Therefore, the ideal Inter frame target size $B_3$ is given by:

$$B_3 = \frac{R_{MAX}}{F} \quad (13)$$

At first, the Inter frame target size, denoted as $B_P$, in case 2, takes the value of the calculated ideal Inter frame size $B_3$, i.e. $B_P = B_3$.

In this case, there is no need of adjusting the target size $B_P$ based on the past encoded Intra frames, since it is assumed that the Inter frames are not influenced by the Intra frames.

Then, in operation 254, the Inter frame target size $B_P$ is recalculated so as to ensure that it does not exceed the maximum size allowed by the maximum bitrate $R_{MAX}$, while keeping a small margin of error and taking into consideration the bits used for encoding the past frames.

To do this, the following expression is used:

$$B_P = \max(0, \min(B_P, tmp2)) \quad (14)$$

with $$tmp2(t) = R_{MAX} - R_{margin} - \sum_{k=t-F}^{t-1} SizeHistory[k],$$

where $R_{margin}$ is the margin of error between the target size and maximum size allowed by the maximum bitrate; for example, $R_{margin} = 1000$ bits.

Figure 4:
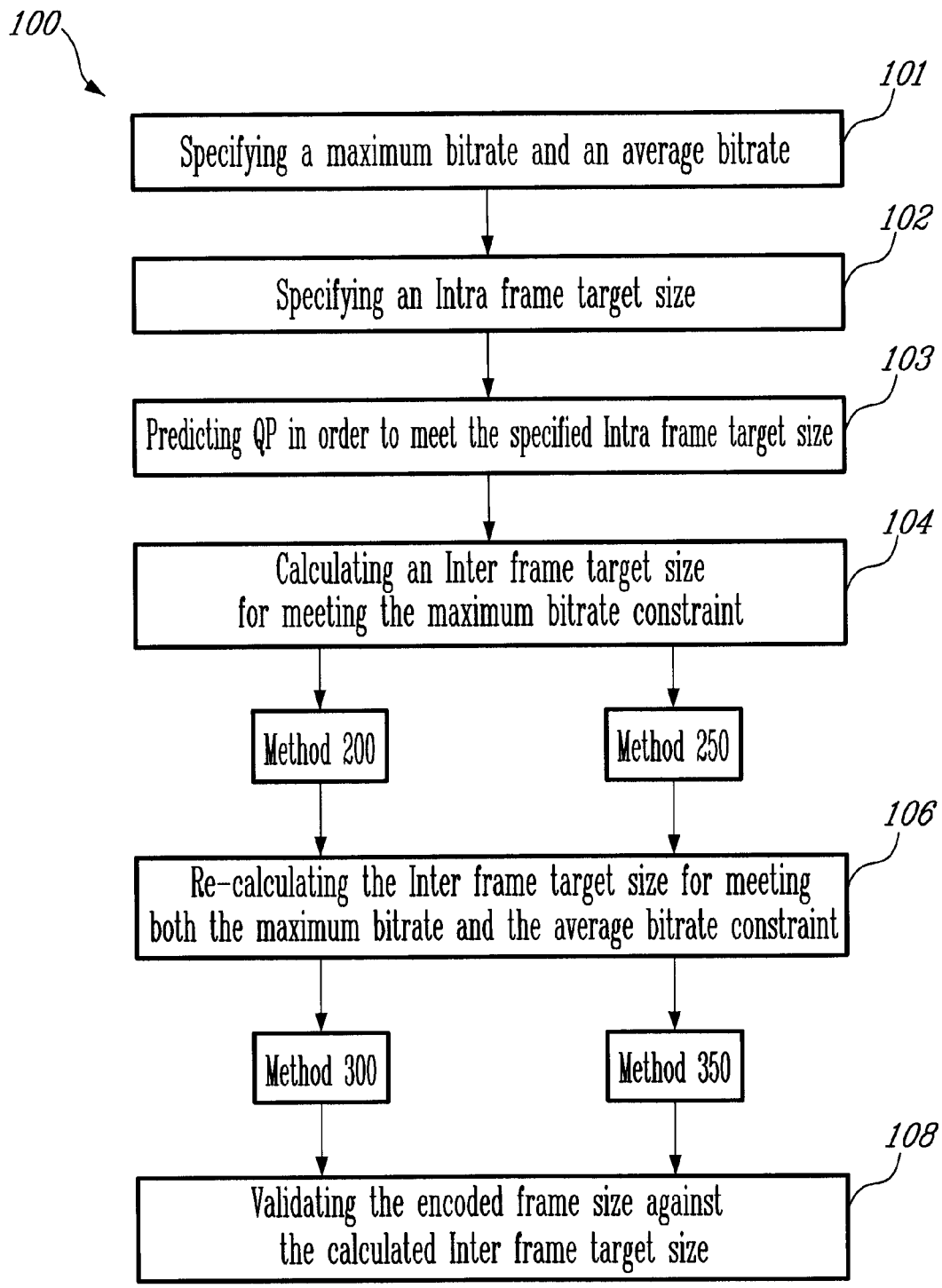
FIG. 4 is a flow chart illustrating a method according to a non-restrictive illustrative embodiment of the present invention for rate control in the H.263 video coding standard.

Once the Inter frame target size has been calculated, either in case 1 or case 2, for meeting with the maximum bitrate constraint, method 100 in FIG. 4 moves on to operation 106, for updating and adjusting the calculated Inter frame size so as to meet both the maximum bitrate and the average bitrate specified in operation 101. This operation 106 can be performed in the second calculator 54 of FIG. 3, for example.

Operation 106: Re-Calculation of the Calculated Inter Frame Size in Order to Meet Both an Average and Maximum Bitrate Constraint Operation 106 uses methods which allow for meeting with both average and maximum bitrate constraint. These methods have two components: i) the computation of Inter frame target sizes in order to meet with the average and maximum bitrate constraint, and ii) the management of additional bits that have not been used in the encoding of the past frames and which could be used in the encoding of the future frames.

Again, the two cases, case 1 and case 2 as described in operation 104, will be considered. Therefore, operation 106 uses method 300 in case 1 and method 350 in case 2.

Method 300 for Re-Calculating the Inter Frame Size in the Case where an Intra Frame is Encoded within the Last Second or is Going to be Encoded in the Upcoming Second (Case 1)

Figure 7:
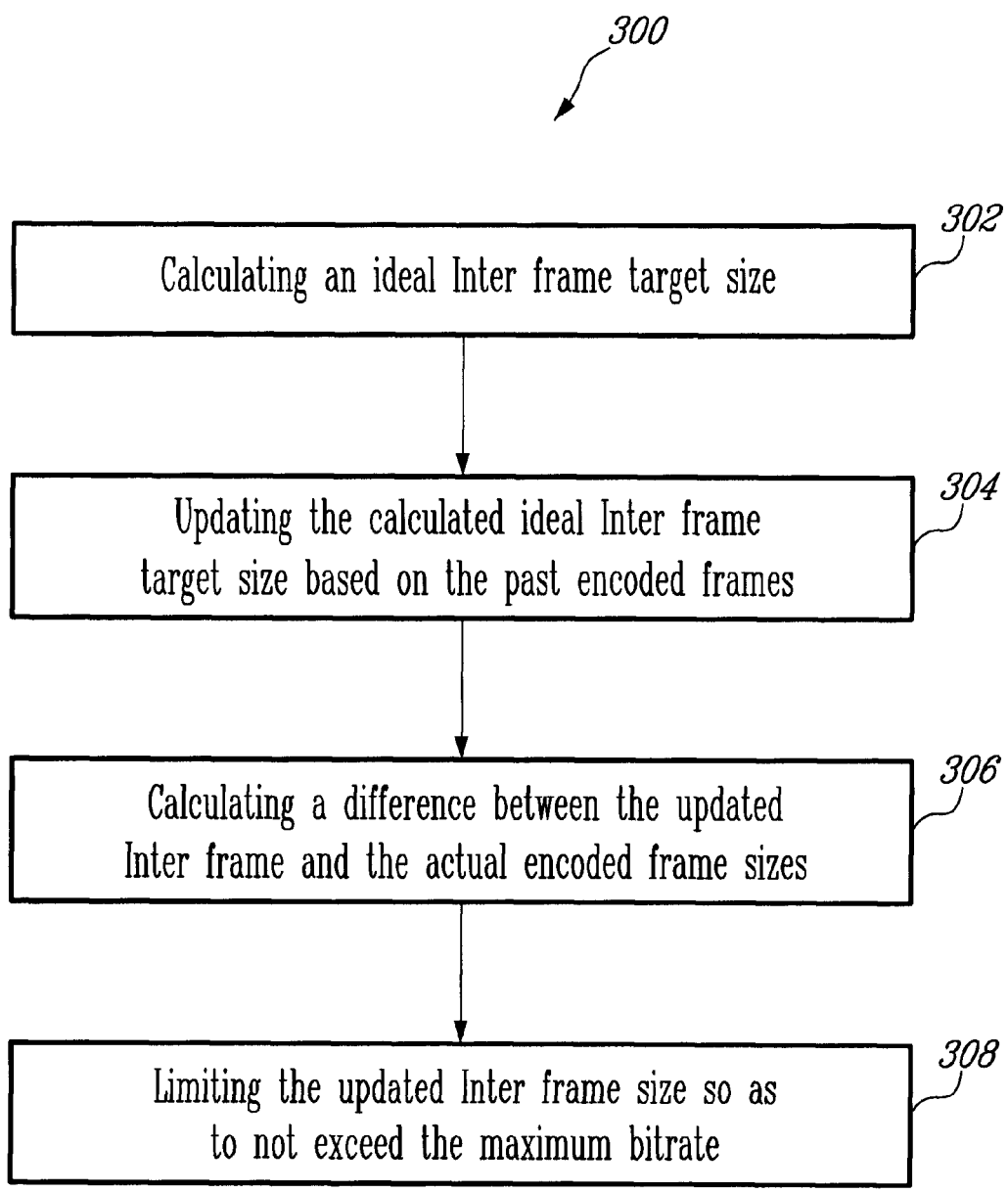
FIG. 7 is a flow chart illustrating an example of method for updating the calculated Inter frame target size.

Referring now to FIG. 7, method 300 for re-calculating the Inter frame target size calculated in operation 104, in case 1, will be described.

First, in operation 302, an ideal Inter frame target size B is calculated, based on the specified average bitrate.

Ideally, Inter frames have the same size, so that, over a period T between two Intra frames, the average bitrate $R_{avg}$ is given by:

$$R_{avg} = \frac{F(B_I + (T-1)B)}{T} \quad (15)$$

Thus, the ideal Inter frame target size B can be expressed as follows:

$$B = \frac{(R_{avg}T/F) - B_I}{T - 1} \quad (16)$$

In order to ensure that the Inter frame size does not exceed the average bitrate $R_{avg}$ and the maximum bitrate $R_{MAX}$, the Inter frame target size $B_{PI}$ is recalculated as follows:

$$B_{PI} = \min(B, B_2) = \min\left(B, \frac{R_{MAX} - B_I}{F - 1}\right) \quad (17)$$

Operation 302 can be computed only once, either when the encoder 14 is first initialized or each time that the bitrate parameters change; the parameters include the specified maximum bitrate, for example.

Then, in operation 304, the calculated target frame size $B_P$, is adjusted so as to take into account the past encoded frames, more particularly the Intra frames. To do so, equations similar to equation (6) or (8) are calculated for obtaining the updated Inter frame target size $B_{PI}$, based on the past encoded frames:

$$B_{PI} = \max(0, \min(B_{PI}, tmp))$$

with tmp as defined in equation (7) or (9) depending on the case: i) if an Intra frame has been encoded within the last second, then equation (7) is used and ii) if an Intra frame is to be encoded in the upcoming second, then equation (9) is used.

Next, in operation 306, differences between the adjusted target frame size and the actual frame size are calculated since, as mentioned hereinabove, encoded frames do not generally have exactly the same size as the target size.

To do so, a variable $B_{extra}$ is used to monitor these differences through the use of the process $30_1$ of FIG. 2, for example. This variable is initialized to zero at the beginning of the communication session. The variable $B_{extra}$ accumulates the number of bits which are over or under the target size, from frame to frame. If $B_{extra}$ is greater than zero, then the actual bitrate is under the specified average bitrate; if $B_{extra}$ is negative, then the actual bitrate is over the specified average bitrate. The update of $B_{extra}$ is performed for each encoded frame as follows:

$$B_{extra} = B_{extra} + B_{target} - B_{encoded} \quad (18)$$

where $B_{target}$ is the target size, which corresponds to $B_{PI}$ for an Inter frame and $B_I$ for an Intra frame, and $B_{encoded}$ is the size of the encoded frame.

If $B_{extra}$ is positive, meaning that the actual bitrate is under the specified average bitrate, then, the unused bits are distributed over the next frames to be used in their encoding; therefore, the target size is increased for the next frames. In the case where $B_{extra}$ is negative, the target size is reduced, for the next frames. The algorithm used is as follows:

If $B_{extra}>0$ (this corresponds to the case where the actual bitrate is under the average bitrate), then $B_{target} = B_{target} + \alpha B_{extra}$ if $\alpha B_{extra} \leq \beta B_{target}$ or $B_{target} = B_{target} + \beta B_{target}$ if $\alpha B_{extra} > \beta B_{target}$ Otherwise $B_{target} = B_{target} + B_{extra}$ with a representing the fraction of additional bits that are used in the current frame and β representing the largest fraction of the target size that can be added. For example, in the simulations, a=0.6 and β=0.15 are used. However, these values could be modified to further improve the performance of the encoder 14. It is within the scope and knowledge of a person of ordinary skill in the art to adjust the values of a and β in order to obtain various performances. Furthermore, the above described method for updating the target size $B_{target}$ can be also modified or changed without deviating from the main concept of this rate control method.

It should be noted that, from an implementation perspective, it is possible to drop encoded frames which lead to a negative $B_{extra}$. In such a case, the actual average bitrate of the encoded frames would be over the specified average bitrate. Also, it is possible to decide to drop encoded frames, which are below a certain threshold. For example, an implementation can use a threshold value of −500 bits.

Finally, operation 308 makes sure that the maximum size allowed by the maximum bitrate $R_{MAX}$ is not exceeded by the adjusted Inter frame target size for the current frame to be encoded. To do so, an equation similar to equation (10) is used to obtain a valid Inter frame target size:

$B_{PI} = \max(0, \min(B_{PI}, tmp2)$ with tmp2 as defined in equation (11).

It is also possible to modify method 300 so as to account for $B_{extra}$ right before operation 306. This is an implementation choice which would lead to some other compromises in behavior and performance without deviating from the main ideas of this rate control method.

In case there is no Intra frame that has been encoded within the last second or that is going to be encoded in the upcoming second, operation 106 uses method 350 for updating the calculated Inter frame target size in order to meet with both the average and maximum bitrates.

Method 350 for Re-Calculating the Inter Frame Size in the Case where No Intra Frame is Encoded within the Last Second or is Going to be Encoded in the Upcoming Second (Case 2)

As mentioned hereinabove, only ideally the Inter frames are of the same size. In reality, the maximum bitrate constraint may have reduced significantly the target size of the Inter frames located close to the Intra frames. In order to compensate for these differences in size, the size of the Inter frames that are not influenced by the Infra frames will be re-evaluated.

Figure 8:
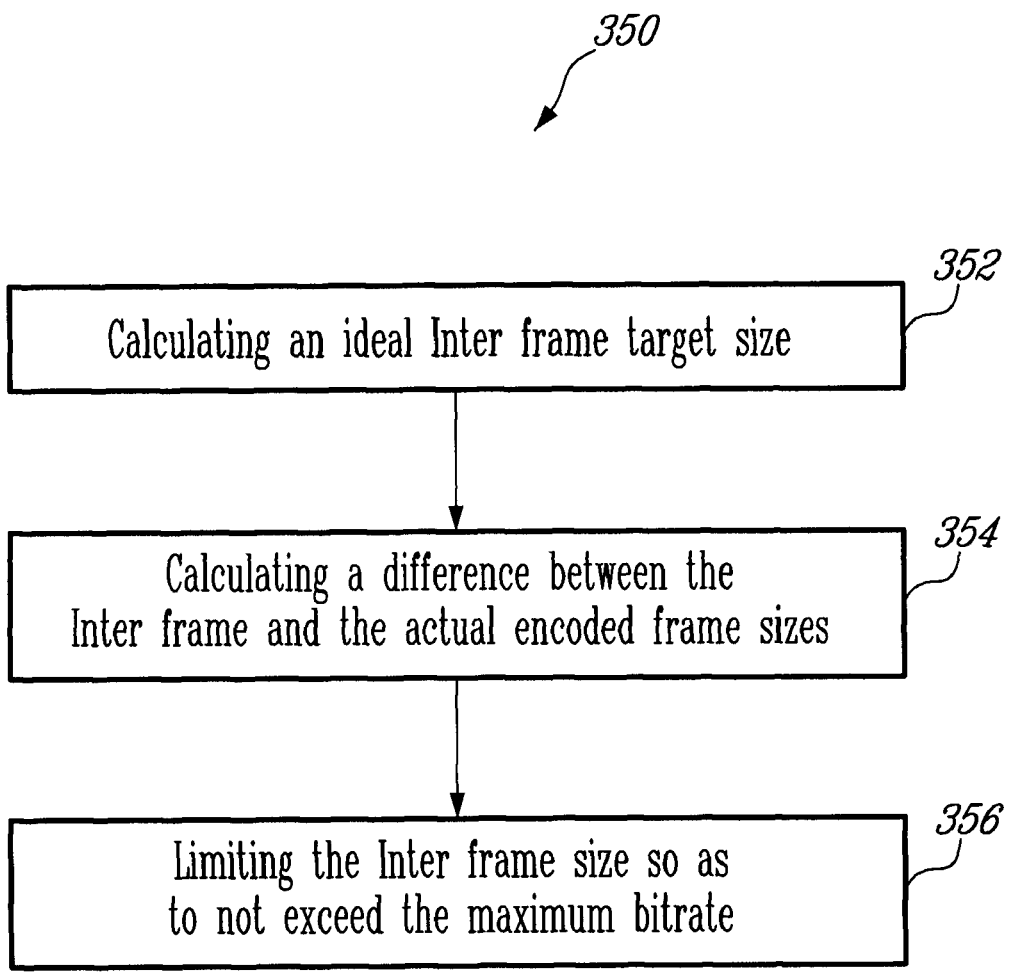
FIG. 8 is a flow chart illustrating another example of method for updating the calculated Inter frame target size.

Referring now to FIG. 8, method 350 for re-calculating the Inter frame target size will be described, in case 2.

First, in operation 352, an ideal Inter frame target size $B_a$ is calculated, based on the average bitrate.

In the ideal situation, the size of the Inter frames is assumed to be of the same length. Therefore, in that case, over the whole period T between two Intra frames, the average bitrate $R_{avg}$ is given by:

$$R_{avg} = F\left(\frac{B_I + (2F-2)B_{PI} + (T-(2F-1))B_a}{T}\right) \quad (19)$$

From equation (19), it can be deduced that the ideal size $B_a$ of the Inter frames is given by:

$$B_a = \frac{(R_{avg}T/F) - B_I - (2F-2)B_{PI}}{T - (2F-1)} \quad (20)$$

Operation 352 can be computed only once, either when the encoder 14 is initialized or each time the bitrate parameters change.

In order to ensure that the Inter frame target size $B_P$ does not exceed the ideal Inter frame target size based on the average bitrate and the Inter frame size calculated in operation 252 of method 250 for not exceeding the maximum bitrate, the target size $B_P$ of the Inter frame is limited as follows:

$$B_P = \min(B_a, B_3) = \min\left(B_a, \frac{R_{MAX}}{F}\right) \quad (21)$$

Then, in operation 354, a difference between the Inter frame size $B_P$ computed in operation 352 and the actual encoded frame size is calculated. This operation is performed for each frame.

The number of bits, resulting from the difference computed in operation 354, are tracked and stored in the variable $B_{extra}$. This variable allows for determining if the actual encoded frame is over or under the specified average bitrate and for compensating for the differences based on the situation. This is done as described in operation 306 of method 300 of FIG. 7 with the target size calculated according to equation (21).

Finally, in operation 356, $B_P$ is limited so as to not exceed the maximum bitrate, while keeping a margin of error and considering the bits used for encoding the past frames. $B_P$ is given by the following equation:

$B_P = \max(0, \min(B_{PI}, tmp2))$ (22)

with $$tmp2 = R_{MAX} - R_{margin} - \sum_{k=t-F}^{t-1} SizeHistory[k],$$

and $R_{margin}$ is the margin of error for the bitrate. For example, $R_{margin} = 1000$ bits.

Once the Inter frame target sizes are calculated, in operation 108 of FIG. 4, a validation operation is performed by the validator 56 of FIG. 3, for example. Indeed, encoded frames usually do not have the same size as the calculated Inter frames. Therefore, if the encoded frame sizes are too large when compared to the calculated target sizes and maximum bitrate, then a re-encoding or dropping mechanism is activated. Those mechanisms are well known in the art and therefore will not be further described in the present specification.

IV. Numerical Examples

In this section, some numerical examples will be described according to method 100 for rate controlling in video coding.

For example, according to method 200 and method 250, if the maximum bitrate is $R_{MAX}$=48000 bps (bits per second), the Intra frame target size is $B_I$=40000 bits and the frame rate is F=10 fps (frames per second) then:
By using equation (5) in operation 202 and equation (12) in operation 252, respectively, it can be found that:

$$B_I = 40000$$

$$B_{PI} = \frac{48000 - 40000}{9} = 888 \text{ bits}$$

$$B_P = \frac{48000}{10} = 4800 \text{ bits}$$

Again, operations 202 and 252 can be computed only once, either when the encoder 14 is initialized or each time that the bitrate parameters change. However, operations 204, 206 and 254 are computed each time, i.e. for each frame, based on the actual encoded frame sizes.

Another example is concerned with method 300 and method 350. In this case, if the maximum bitrate is $R_{MAX}$=48000 bps, the average bitrate is $R_{avg}$=32000 bps, the Intra frame target size is $B_I$=40000 bits, the period of the Intra frames is T=4 s, i.e. each 40 frames, and the frame rate is F=10 fps, then:
By using equation (17) in operation 302 and equation (20) in operation 354, it can be found that:

$$B_I = 40000$$

$$B_{PI} = \min\left(\frac{\left(\frac{32000 \cdot 40}{10}\right) - 4000}{39}, \frac{48000 - 40000}{9}\right)$$
$$= \min(2256, 888)$$
$$= 888 \text{ bits}$$

$$B_P = \min\left(\frac{\left(\frac{32000 \cdot 40}{10}\right) - 40000 - (20 - 2)(888)}{40 - 19}, \frac{48000}{10}\right)$$
$$= \min(3429, 4800)$$
$$= 3429 \text{ bits}$$

Again, operations 302 and 352 can be computed only once, either when the encoder 14 is initialized or each time that the bitrate parameters change. However, operations 304, 306, 308, 354 and 356 are computed for each frame, based on the actual encoded frame sizes.

The average bitrate, which can be obtained if all frames are encoded as planned by using the calculated target sizes, is then computed, using equation (19) with $B_P$=3429 bits:

$$R_{avg} = F\left(\frac{B_I + (2F - 2)B_{PI} + (T - (2F - 1))B_P}{T}\right)$$
$$= 10\left(\frac{40000 + (18)(888) + (40 - (19))(3429)}{40}\right)$$
$$= 32000 \text{ bits}$$

Therefore, the desired ideal result is obtained. In certain cases, the maximum bitrate and Intra frame target size may limit the average bitrate especially if the maximum bitrate is close to the average bitrate and if the target Intra frame size is large. For instance, if in the previous example the average bitrate is 48000 bps then:

$$B_I = 40000$$

$$B_{PI} = \min\left(\frac{\left(\frac{48000 \cdot 40}{10}\right) - 4000}{39}, \frac{48000 - 40000}{9}\right)$$
$$= \min(3897, 888)$$
$$= 888 \text{ bits}$$

$$B_P = \min\left(\frac{\left(\frac{48000 \cdot 40}{10}\right) - 40000 - (20 - 2)(888)}{40 - 19}, \frac{48000}{10}\right)$$
$$= \min(6476, 4800)$$
$$= 4800 \text{ bits}$$

The average bitrate, which can be obtained if all frames are encoded as planned, is computed as follows, with $B_P$=4800 bits:

$$R_{avg} = F\left(\frac{B_I + (2F - 2)B_{PI} + (T - (2F - 1))B_P}{T}\right)$$
$$= 10\left(\frac{40000 + (18)(888) + (40 - (19))(4800)}{40}\right)$$
$$= 39196 \text{ bits}$$

But in reality, a smaller average bitrate is observed because encoded frame sizes will fluctuate around the target sizes. Therefore, results given by equation (19) correspond to a theoretical maximum.

It should be noted that the calculation of the Inter frame target size in method 100 depends on the position of the Inter frame relative to an Intra frame.

V. Management of Encoded Frames Leading to Exceeding the Calculated Target Sizes In the TMN8 rate control, all encoded frames are transmitted even if their transmission will lead to a situation where the specified average bitrate is exceeded. After the transmission of a frame, if the specified average bitrate is exceeded, then the encoder will skip one or several frames, as needed, until the specified average bitrate is respected again. Therefore this control is reactive rather than proactive.

The above scheme may be acceptable for meeting an average bitrate. However, it is not acceptable if a maximum bitrate must never be exceeded, as it is the case in many real life applications using a physical transmission channel.

Indeed, since the size of any frame can potentially exceed the target size, a mechanism where encoded frames leading to exceeding the maximum bitrate will be dropped before being transmitted should be implemented. The problem with this approach is that video encoding uses frame to frame prediction (temporal predictive coding). Therefore, if a frame is dropped, the state of the encoder needs to be restored prior to the re-encoding of the dropped frame, otherwise the encoder and decoder will not be synchronized.

Therefore, the device 42 according to the non-restrictive embodiment of the present invention memorizes the encoder state variables before encoding a frame. If the encoded frame size leads to exceeding the maximum bitrate, then it is dropped and the state variables are restored for the next frame to encode. Otherwise the encoded frame is transmitted and the encoder 14 continues with the new state variables.

This feature can also be used for other applications such as multipass encoding where multiple encoding iterations on a frame can be performed until a goal in size and/or quality are met.

The encoder 14 may drop or skip frames under two conditions. First, if an encoded frame exceeds the maximum bitrate then it will be automatically dropped. Secondly, if the number of bits transmitted exceeds the specified average bitrate, then future frames may be skipped, not the one that was just encoded but the ones that follow, until the average bitrate is respected again. More specifically, future frames could be skipped if the specified average bitrate is exceeded by a certain threshold value and the current frame will be dropped only in the case where keeping it would lead to exceeding the maximum bitrate.

Furthermore, the encoder 14 allows for requesting an Intra frame at any moment, leading to an implementation of an "Intra frame on demand" feature. Obviously, in such a case, the Intra frame target size may not be respected without exceeding the maximum bitrate. If this happens, the encoder 14 will compute and use the maximum Intra frame target size without exceeding the maximum bitrate. If the encoded Intra frame size exceeds the maximum bitrate, then it will be dropped and the encoder 14 will wait for a certain period of time before trying again to encode that Intra frame. The encoder 14 will continue to wait and try to encode that Intra frame until the encoded Intra frame size respects the maximum bitrate. At each failed attempt, the Intra frame target size is reduced so as to avoid an infinite loop, where the encoded frame size is always above the maximum bitrate.

In general, the encoder 14 requests the following parameters, when encoding video data and frames:
- Intra frame target size, as specified in operation 102 of method 100;
- Average bitrate, as specified in operation 101 of method 100; and
- Maximum bitrate, as specified in operation 101 of method 100.

It should be noted that the encoder 14 can perform several validations of the above-given parameters and may change the parameter values if using them is not possible. For instance, with a given Intra frame target size and maximum bitrate, the average bitrate may not be achievable. Therefore the parameters will be changed and the average rate recalculated.

VI. A Second Non-Limitative Embodiment of the Rate Control for H.263 Based on a Buffer In the previous embodiment, the maximum bitrate $R_{MAX}$ was defined as the maximum number of bits which can be transmitted during a period of one (1) second.

However, in applications such as video streaming, a different definition of the maximum bitrate is considered, which takes into account the actual limitations existing in those applications.

In video streaming, video packets are sent through a capacity-limited channel; therefore the bitrate is limited. If a delay of one (1) second is considered acceptable before the player 20 in FIG. 1 starts playing a first received Intra frame, then the Intra frame target size should be inferior to $R_{MAX}$ as will be explained hereinbelow.

The decoder 18 has to wait for one (1) second before the player 20 starts playing the first received frame. However, it does not mean that one cannot transmit additional frames during this delay of one (1) second. Now, suppose that $B_I = R_{MAX}$ and that not exceeding the maximum bitrate $R_{MAX}$ is equivalent to the condition that the transmission buffer 40 does not exceed $R_{MAX}$. Then, at time t=0, the buffer 40 of FIG. 2 is full, since a frame of size $R_{MAX}$ has been just inserted. If F=10 fps and $R_{MAX}$=48000 bps, then at t=0.1 second, the buffer 40 is emptied by $R_{MAX}/F$=4800 bits, since they have been transmitted through the channel. Therefore, 4800 bits become available for encoding a frame at the given time of t=0.1 second and without overflowing the transmission buffer 40. The same approach applies for the following frames. Therefore, for each frame following the Intra frame, an additional amount of 4800 bits can be transmitted. Thus, with this approach, it is possible to transmit in total 48000+(10-1)(4800)=91200 bits, instead of 48000 bits as shown and described hereinabove.

Those additional available bits allow for improving the quality of the frames following an Intra frame, since they are used to increase the number of bits for encoding the Inter frames following the Intra frame.

However, it should be noted that the 91200 bits calculated previously, are not sent during one (1) second but because of the delay induced by the applications to receive a transmitted Intra frame, the time covering those bits is 1.9 seconds: 1 second of delay and 9 frames from time 1.1 s to 1.9 s, which gives a bitrate of (91200 bits/1.9 s)=48000 bits/s, corresponding to the maximum bitrate $R_{MAX}$.

For illustration purposes, it will be considered that the maximum buffer size will correspond to the maximum bitrate $R_{MAX}$. However the maximum buffer size could be set with a different value. Those of ordinary skill in the art will know how to modify the formulas accordingly.

Now, the case where a next Intra frame is coming will be considered. Since the next Intra frame is coming, the buffer 40 has to be gradually emptied in order to have sufficient space for the upcoming Intra frame at its scheduled time.

Even though the target size for the Intra frame is $B_I$, it is desirable, for practical purposes, to have an empty buffer 40 so as to allocate more available bits to the frames following the Intra frame in order to improve quality thereof.

So, in practical applications, $B_I < R_{MAX}$. Therefore, the number of bits allocated to the frames following the Intra frame is increased so as to obtain an improved quality of those frames, before starting to empty the buffer 40.

Let zero (0) be the time of the arrival of an Intra frame. Then, N is defined as the number of frames after the Intra frame over which the unused bits from the encoding of the Intra frame are distributed. And L is defined as the number of Inter frames over which the buffer level is optimized. It should be noted that at t=L, the buffer 40 is full and 0=N=L.

Generally stated, a possible strategy that can be adopted is as follows.

At all times, the buffer level does not exceed $R_{MAX}$, meaning that encoded frames that generate an overflow will be dropped. The bits not used in the encoding of the Intra frame are used in the encoding of the following Inter frames in order to maximize the buffer level and to increase the overall quality of the videos, since usually the quality of videos is the worst after an Intra frame. Until frame number L, the buffer 40 is kept full by encoding frames with a target size of $R_{MAX}/F$. Furthermore, the bits that have been computed but not used in the previous frames are redistributed over the following frames; however the target size must not exceed a certain value, which depends on the target buffer level, which itself depends on the frame index in time. It should be noted that the target buffer level is $R_{MAX}$ for the first frame after an Intra frame and gradually decreases to zero (0) until the next Intra frame comes.

Referring now to FIG. 9, method 400 for improved rate controlling in video coding will be described.

In operation 402, at time t=0, an Intra frame is received by the transmission buffer 40. Therefore, at time t=0, the target frame size is $B_P(t)=B_I$.

In operation 404, comparison between a new buffer level (which is the sum of the previous buffer level and the size of the actual encoded Intra frame) and the maximum buffer size $R_{MAX}$ is performed.

If the new buffer level is larger than the maximum buffer size $R_{MAX}$ as tested in operation 406, then in operation 408, the actual encoded frame is dropped. Also the encoder state variables prior to encoding that frame will be restored (including the buffer level, which will be restored to the buffer level value prior to encoding).

If the new buffer level is smaller than the maximum buffer size $R_{MAX}$, then in operation 410, an Inter frame target size $B_P(t)$ is calculated for each frame at time t within a period T between two Intra frames, by using the following expression:

$$B_P(t) = B_P^I(t) \quad \text{if } t = 1, 2, 3, \ldots, L$$

$$B_P(t) = \frac{TR_{MAX} - FB_I - F\sum_{k=1}^{L} B_P^I(k)}{F(T-L-1)} \quad \text{if } t = L, L+1, \ldots, T-1$$

with $B_P^I(t)$ being arbitrary but with the condition that the buffer 40 must not overflow, i.e. the buffer level=$R_{MAX}$ and has to be near full at t=L.

Then, in operation 412, a maximum buffer level is calculated, which cannot be exceeded. Indeed, for each frame, the maximum buffer level should be computed so as to ensure that there is sufficient space in the buffer 40 for inserting the next Intra frame. The size of an Intra frame cannot exceed $R_{MAX}$. Therefore, for the frame at T−1, the buffer level cannot exceed $R_{MAX}-B_I+R_{MAX}/F$ so that at the beginning of the next Intra frame, the buffer level does not exceed $R_{MAX}-B_I$.

However, for practical reasons, the size of the buffer 40 should be $R_{MAX}/F$ instead of $R_{MAX}-B_I+R_{MAX}/F$, as mentioned hereinabove. This is because, in reality, it is hard to predict precisely the actual size of the encoded Intra frame. The current existing algorithms are not robust enough. Therefore, it is safer to have the buffer 40 be emptied at frame T−1 so that more bits can be used for the frames following the Intra frame.

Therefore, the maximum buffer level is calculated as follows:

$$BufferLevel_{MAX}(t) = R_{MAX} \quad \text{if } t = 0, 1, \ldots, L$$

$$BufferLevel_{MAX}(t) = \frac{\frac{R_{MAX}(FT-F-L)}{F(T-L-1)} + }{t\frac{R_{MAX}(1-F)}{F(T-F)}} \quad \text{if } t = L+1, \ldots, T-1$$

Then, in operation 414, the Inter frame target size, calculated in operation 410, is updated so as to incorporate the unused bits from the encoding of the Intra frame.

There are many ways to distribute the unused bits over the Inter frames following an Intra frame. It should be noted that after frame L, the buffer 40 should be full in order to optimize the quality of the videos following the Intra frame.

For example, in order to distribute equally the unused bits over the N following frames, the target frame size at time t is given by:

$$B_P(t) = \frac{R_{MAX}}{F} + \frac{(R_{MAX} - B_I)}{N} \quad \text{if } 0 < t = N$$

$$B_P(t) = B_P^I = \frac{R_{MAX}}{F} \quad \text{if } N < t = L$$

$$B_P(t) = B_P^p = \frac{R_{MAX}(T-F-L)}{F(T-L-1)} \quad \text{if } t = L, L+1, \ldots, T-1$$

It should be noted that if L=N, then the target frame sizes of $R_{MAX}/F$ are not present. Also, T>F+L so that the buffer 40 will have sufficient time to empty itself between two Intra frames.

In operation 416, the buffer level, assigned to each future frame, is calculated so as to take into consideration the updated Inter frame target size.

Accordingly, the buffer level is given by:

$$BufferLevel(t) = R_{MAX} - \frac{(N-t)(R_{MAX}-B_I)}{N} \quad \text{if } 0 = t = N$$

$$BufferLevel(t) = R_{MAX} \quad \text{if } N = t < L$$

$$BufferLevel(t) = \frac{\frac{R_{MAX}(FT-F-L)}{F(T-L-1)} + }{t\frac{R_{MAX}(1-F)}{F(T-F)}} \quad \text{if } t = L+1, \ldots, T-1$$

It should be noted that, at the beginning, the transmission buffer 40 is empty and then frames of size $B_I$ and $B_P(t)$ are successively inserted according to their computation.

Then, in operation 418, a margin $\Delta(t)$ for encoding a frame is calculated:

$$\Delta(t) = BufferLevel_{MAX}(t) - BufferLevel(t)$$

so that:

$$\Delta(t) = \frac{(N-t)(R_{MAX}-B_I)}{N} \quad \text{if } 0 = t = N$$

$$\Delta(t) = 0 \quad \text{if } N = t < T-1$$

Generally, when the encoder 14 encodes the frame, the encoded frame size is slightly different than the target size; in case a target size is larger than the encoded frame, the unused bits are redistributed over the next frames, as long as the maximum buffer level is not exceeded. Therefore, after the encoding of the frame, E(t), indicative of the number of possible additional bits is computed in operation 420. Those unused bits, resulting from the encoding of the frame, can be used for encoding the next frames. E(t) is defined as:

$$E(t) = BufferLevel(t) - BufferLevel_{actual}(t) = BufferLevel_{MAX}(t) - BufferLevel_{actual}(t) - \Delta(t)$$

where $BufferLevel_{actual}(t)$ is the buffer level after the actual encoding of a frame.

It should be noted that generally a fraction of the additional bits is used to ensure that the maximum buffer level is not exceeded. Those of ordinary skill in the art will know how to specify the fraction of the additional bits in order to ensure that the maximum buffer level is not exceeded.

However, it may happen that an encoded frame is larger than a target frame size. In this case, E(t) is negative or is inferior to a certain given threshold value. Therefore, in operation 422, a validation process is performed on the encoded frame. If the encoded frame has exceeded the target frame size, then this encoded frame is dropped. Also, in this case, the encoder state variables are restored to their values prior to encoding the frame.

It is worth noting that, for example, operation 410 of method 400 can be performed through the first calculator 52 in FIG. 3, and operation 412 of method 400 can be performed through the second calculator 54 in FIG. 3. Also, an optimizer (not shown) provided by the process 30₁ in FIG. 2, for example, allows for optimizing the transmission buffer 40 over L frames.

VII. Numerical Examples

For example, the same values as given in the previous numerical example can be used: $R_{MAX}$=48000 bits, $B_I$=40 000 bits, F=10 fps, T=40, i.e. 4 s. Furthermore, assuming that N=3 and L=F−1=9, then, $$B_P(t) = 40000 \quad \text{if } t = 0$$
$$B_P(t) = 7466 \quad \text{if } 0 < t = N$$
$$B_P(t) = 4800 \quad \text{if } N < t = L$$
$$B_P(t) = 3360 \quad \text{if } t = L, L+1, \ldots, T-1$$

Using the above-calculated values, the maximum bitrate can be calculated as follows:

$$R_{MAX} = 10\left(\frac{40000 + (3)(7466) + (9-3)(4800) + (39-9)(3360)}{40}\right)$$
$$= 48000 \text{ bits}$$

This result is more interesting than the 39.2 kbps given by method 100. Also, since the additional bits are distributed over the Inter frames following an Intra frame, the visual quality of the frames is improved.

Although the present invention has been described in the foregoing specification by means of non-restrictive illustrative embodiments, these illustrative embodiments can be modified at will within the scope of the appended claims without departing from the spirit and nature of the subject invention.

What is claimed is:

1. A method for rate controlling in video encoding of a video stream, the method comprising:
    specifying a maximum bitrate and an average bitrate for the video stream;
    calculating an Inter frame size based on a position of the Inter frame relative to an Intra frame so as to ensure that the specified maximum bitrate is not exceeded; and
    adjusting the calculated Inter frame size so as to ensure that both the specified maximum bitrate is not exceeded and the specified average bitrate is substantially obtained;
    wherein the calculating the Inter frame size comprises calculating an ideal Inter frame size based on the specified maximum bitrate according to the following equation, provided the position of the Inter frame indicates that an Intra frame has been encoded during a last-occurred time period or is going to be encoded during an upcoming time period:

$$B_2 = \frac{R_{MAX} - B_I}{(F-1)}$$

where $B_2$ is the ideal Inter frame size, $R_{MAX}$ is the specified maximum bitrate, F is a frame rate, and $B_1$ is the Intra frame size.

2. The method as defined in claim 1, further comprising specifying a size of the Intra frame.

3. The method as defined in claim 2, further comprising estimating quantization parameters of the Intra frame for encoding the Intra frame so as to achieve a specified size of the Intra frame.

4. A method for rate controlling in video encoding of a video stream, the method comprising:
    specifying a maximum bitrate and an average bitrate for the video stream;
    calculating an Inter frame size based on a position of the Inter frame relative to an Intra frame so as to ensure that the specified maximum bitrate is not exceeded; and
    adjusting the calculated Inter frame size so as to ensure that both the specified maximum bitrate is not exceeded and the specified average bitrate is substantially obtained;
    wherein the calculating the Inter frame size comprises calculating an ideal Inter frame size based on the specified maximum bitrate according to the following equation, provided the position of the Inter frame indicates that no Intra frame has been encoded during a last-occurred time period or is going to be encoded during an upcoming time period:

$$B_3 = \frac{R_{MAX}}{F}$$

where $B_3$ is the ideal Inter frame size, $R_{MAX}$ is the specified maximum bitrate, and F is a frame rate.

5. The method as defined in claim 1, wherein the calculating the Inter frame size further comprises taking into consideration past encoded frames.

6. The method as defined in claim 5, wherein the calculating the Inter frame size $B_{PI}$ which takes into consideration past encoded frames comprises using the following equations, when an Intra frame has been encoded within a last-occurred time period:

$$B_{PI} = \max(0, \min(B_{PI}, tmp(t)))$$

with $$tmp(t) = \frac{R_{MAX} - \sum_{k=t-(T-N)}^{t-1} SizeHistory[k]}{F - (T-N)}$$

where SizeHistory[k] is a size of an encoded frame k, t is an index of a current frame to encode, T is a period between two Intra frames, and N is a number of frames remaining before the next Intra frame.

7. The method as defined in claim 6, wherein calculating the Inter frame size $B_{PI}$ which takes into consideration past encoded frames further comprises using the following equations, when an Intra frame needs to be encoded in an upcoming time period:

$$B_{PI} = \max(0, \min(B_{PI}, tmp(t)))$$

with $$tmp(t) = \frac{R_{MAX} - B_I - \sum_{k=t-(F-N)+1}^{t-1} SizeHistory[k]}{N}$$

where $B_I$ is the Intra frame size.

8. The method as defined in claim 5, wherein the calculating the Inter frame size which takes into consideration past encoded frames comprises taking into consideration past Intra frames.

9. The method as defined in claim 1, wherein the calculating the Inter frame size further comprises limiting the Inter frame size to a maximum size allowed by the specified maximum bitrate.

10. The method as defined in claim 9, wherein the limiting the Inter frame size $B_{PI}$ comprises using the following equations:

$$B_{PI} = \max(0, \min(B_{PI}, tmp2(t)))$$

with $$tmp2(t) = R_{MAX} - R_{margin} - B_I - \sum_{k=t-F+1}^{t-1} SizeHistory[k]$$

where $R_{margin}$ is a margin of errors for ensuring that the Inter frame size $B_{PI}$ does not exceed the maximum size allowed by the specified maximum bitrate $R_{MAX}$, and $B_I$ is the Intra frame size.

11. The method as defined in claim 4, wherein the calculating the Inter frame size further comprises limiting the Inter frame size to a maximum size allowed by the specified maximum bitrate by using the following equation:

$$B_P = \max(0, \min(B_p, tmp2(t)))$$

with $B_P$ being the Inter frame size and $$tmp2(t) = R_{MAX} - R_{margin} - \sum_{k=t-F}^{t-1} SizeHistory[k],$$

where $R_{margin}$ is an error margin between the Inter frame size and the maximum size allowed by the maximum bitrate $R_{MAX}$, SizeHistory[k] is a size of an encoded frame k, and t is an index of a current frame to encode.

12. The method as defined in claim 1, wherein the adjusting the calculated Inter frame size comprises calculating an ideal Inter frame size based on the specified average bitrate.

13. The method as defined in claim 12, wherein the calculating the ideal Inter frame size comprises using the following equation, when the position of the Inter frame indicates that an Intra frame has been encoded during a last-occurred time period or is going to be encoded during an upcoming time period:

$$B = \frac{(R_{avg}T/F) - B_I}{T - 1}$$

where B is the ideal Inter frame size, $R_{avg}$ is the average bitrate, $B_I$ is a size of the Intra frame, T is a period between two Intra frames, and F is a frame rate.

14. The method as defined in claim 12, wherein the calculating the ideal Inter frame size further comprises using the following equation, when the position of the Inter frame indicates that no Intra frame has been encoded during a last-occurred time period or is going to be encoded during an upcoming time period:

$$B_a = \frac{(R_{avg}T/F) - B_I - (2F-2)B_{PI}}{T - (2F-1)}$$

where $B_a$ is the ideal Inter frame size, $R_{avg}$ is the average bitrate, $B_I$ is a size of the Intra frame, $B_{PI}$ is the Inter frame size, T is a period between two Intra frames, and F is a frame rate.

15. The method as defined in claim 1, wherein the adjusting the calculated Inter frame size comprises taking into consideration past encoded frames.

16. The method as defined in claim 15, wherein the adjusting the calculated Inter frame size further comprises comparing the calculated Inter frame size with a corresponding encoded frame size.

17. The method as defined in claim 16, wherein comparing the calculated Inter frame size with a corresponding encoded frame size comprises storing results of the comparison in a variable.

18. The method as defined in claim 17, wherein storing the results of the comparison comprises updating the variable using the following equation: $B_{extra}^{updated} = B_{extra} + B_{target} - B_{encoded}$ where $B_{extra}$ is the variable, $B_{extra}^{updated}$ is an updated variable, $B_{target}$ is the calculated Inter frame size, and $B_{encoded}$ is the corresponding encoded frame size.

19. The method as defined in claim 18, wherein the updating the variable $B_{extra}$ comprises distributing extra bits, usable for encoding future Inter frames, over a next Inter frame size, provided the variable $B_{extra}$ is positive.

20. The method as defined in claim 18, wherein the updating the variable $B_{extra}$ comprises reducing the calculated Inter frame size for a next Inter frame size provided the variable $B_{extra}$ is negative.

21. The method as defined in claim 18, wherein the updating the variable $B_{extra}$ comprises dropping an encoded Inter frame provided the variable $B_{extra}$ is below a given threshold.

22. The method as defined in claim 12, wherein the adjusting the calculated Inter frame size further comprises limiting the Inter frame size to a maximum size allowed by the specified maximum bitrate.

23. The method as defined in claim 1, further comprising verifying that an encoded frame size is smaller than the adjusted Inter frame size prior to transmission.

24. The method as defined in claim 1, further comprising storing encoder state variables before encoding a frame and restoring the encoder state variables after an encoded frame has been dropped.

25. The method as defined in claim 1, further comprising dropping encoded frames, which frame size results in exceeding the specified maximum bitrate.

26. The method as defined in claim 25, further comprising dropping encoded frames, which frame size results in exceeding the specified average bitrate.

27. The method as defined in claim 26, further comprising re-encoding the encoded frames, which frame size results in exceeding the specified average and maximum bitrates, with different encoding parameters.

28. A device for rate controlling in video encoding of a video stream, the device comprising:
a memory, storing computer readable instructions for execution by a processor, causing the processor to:
specify a maximum bitrate and an average bitrate for the video stream;
calculate an Inter frame size based on a position of the Inter frame relative to an Intra frame so as to ensure that the specified maximum bitrate is not exceeded; and
adjust the calculated Inter frame size so as to ensure that both the specified maximum bitrate is not exceeded and the specified average bitrate is substantially obtained;
wherein the processor is further configured to calculate an ideal Inter frame size based on the specified maximum bitrate according to the following equation, provided the position of the Inter frame indicates that an Intra frame has been encoded during a last-occurred time period or is going to be encoded during an upcoming time period:

$$B_2 = \frac{R_{MAX} - B_I}{(F - 1)}$$

where $B_2$ is the ideal Inter frame size, $R_{MAX}$ is the specified maximum bitrate F is a frame rate, and $B_I$ is the Intra frame size.

29. The device as defined in claim 28, wherein the computer readable instructions further cause the processor to predict an Intra frame size and quantizing parameters of the Intra frame.

30. The device as defined in claim 28, wherein the computer readable instructions further cause the processor to validate that an encoded frame size is smaller than the adjusted Inter frame size, prior to transmission.

31. The device as defined in claim 28, further comprising a circular buffer for storing transmitted frames.

32. The device as defined in claim 28, wherein the computer readable instructions further cause the processor to store encoder state variables before encoding a frame, and to restore the encoder state variables after an encoded frame has been dropped.

33. The device of claim 28, wherein the processor is further configured to adjust the calculated Inter frame size so as to ensure that the specified average bitrate is substantially obtained.

34. The device of claim 28, wherein the computer readable instructions further cause the processor to take into consideration past encoded frames, when calculating the Inter frame size.

35. The device as defined in claim 34, wherein the computer readable instructions further cause the processor to take into consideration past Intra frames.

36. The device as defined in claim 28, wherein the computer readable instructions further cause the processor to limit the Inter frame size to a maximum size allowed by the specified maximum bitrate, when calculating the Inter frame size.

37. The device as defined in claim 28, wherein the computer readable instructions further cause the processor to take into consideration past encoded frames, when adjusting the calculated Inter frame size.

38. The device as defined in claim 37, wherein the computer readable instructions further cause the processor to compare the calculated Inter frame size with a corresponding encoded frame size, and to store results of the comparison in a variable.

39. The device as defined in claim 28, wherein the computer readable instructions further cause the processor to perform one of the following:
distribute extra bits, usable for encoding future Inter frames, over a next Inter frame size;
reduce the calculated Inter frame size for a next Inter frame size; and
drop an encoded Inter frame.

40. The device as defined in claim 12, wherein the computer readable instructions further cause the processor to limit the Inter frame size to a maximum size allowed by the specified maximum bitrate, when adjusting the calculated Inter frame size.

41. The device as defined in claim 28, wherein the computer readable instructions further cause the processor to drop encoded frames, which frame size results in exceeding the specified maximum bitrate.

42. The device as defined in claim 41, wherein the computer readable instructions further cause the processor to drop encoded frames, which frame size results in exceeding the specified average bitrate.

43. The device as defined in claim 42, wherein the computer readable instructions further cause the processor to re-encode the encoded frames, which frame size results in exceeding the specified average and maximum bitrates, with different encoding parameters.

44. An encoder for video coding of a video stream, comprising:
a processor;
a device for rate controlling in the video coding, comprising:
a memory, storing computer readable instructions for execution by a processor, causing the processor to:
specify a maximum bitrate and an average bitrate for the video stream;
calculate an Inter frame size based on a position of the Inter frame relative to an Intra frame so as to ensure that the specified maximum bitrate is not exceeded; and
adjust the calculated Inter frame size so as to ensure that both the specified maximum bitrate is not exceeded and the specified average bitrate is substantially obtained;
wherein the processor is further configured to calculate an ideal Inter frame size based on the specified maximum bitrate according to the following equation, provided the position of the Inter frame indicates that an Intra frame has been encoded during a last-occurred time period or is going to be encoded during an upcoming time period:

$$B_2 = \frac{R_{MAX} - B_I}{(F - 1)}$$

where $B_2$ is the ideal Inter frame size, $R_{MAX}$ is the specified maximum bitrate, F is a frame rate, and $B_I$ is the Intra frame size.

45. A device for rate controlling in video encoding of a video stream, the device comprising:
a memory, storing computer readable instructions for execution by a processor, causing the processor to:

specify a maximum bitrate and an average bitrate for the video stream;

calculate an Inter frame size based on a position of the Inter frame relative to an Intra frame so as to ensure that the specified maximum bitrate is not exceeded; and adjust the calculated Inter frame size so as to ensure that both the specified maximum bitrate is not exceeded and the specified average bitrate is substantially obtained;

wherein the calculating the Inter frame size comprises calculating an ideal Inter frame size based on the specified maximum bitrate according to the following equation, provided the position of the Inter frame indicates that no Intra frame has been encoded during a last-occurred time period or is going to be encoded during an upcoming time period:

$$B_3 = \frac{R_{MAX}}{F}$$

where $B_3$ is the ideal Inter frame size, $R_{MAX}$ is the specified maximum bitrate, and F is a frame rate.

* * * * *

UNITED STATES PATENT AND TRADEMARK OFFICE
CERTIFICATE OF CORRECTION

PATENT NO. : 8,401,076 B2  Page 1 of 1
APPLICATION NO. : 12/518955
DATED : March 19, 2013
INVENTOR(S) : Stéphane Coulombe et al.

It is certified that error appears in the above-identified patent and that said Letters Patent is hereby corrected as shown below:

In the Claims:

Column 24, line 33, "$B_{extra}^{updated}$" should read -- $B_{extra}^{updated}$ --.

Column 24, line 35, "$B_{extra}^{updated}$" should read -- $B_{extra}^{updated}$ --.

Column 25, line 27, "bitrate F" should read -- bitrate, $F$ --.

Signed and Sealed this
Thirtieth Day of April, 2013

Teresa Stanek Rea
*Acting Director of the United States Patent and Trademark Office*